US006668199B1

United States Patent
Arcidiacono et al.

(10) Patent No.: US 6,668,199 B1
(45) Date of Patent: Dec. 23, 2003

(54) FABRICATION METHOD FOR A CONTROL UNIT FOR ELECTRONIC MICROCONTROLLERS OR MICOPROCESSORS

(75) Inventors: Liliana Arcidiacono, Tremestieri Etneo (IT); Vincenzo Matranga, Palermo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 211 days.

(21) Appl. No.: 09/595,759

(22) Filed: Jun. 16, 2000

(30) Foreign Application Priority Data

Jun. 16, 1999 (EP) ............................. 99830375

(51) Int. Cl.[7] ............................. G05B 11/01
(52) U.S. Cl. ............................. 700/12; 700/13; 700/23; 700/19; 700/20; 700/117; 700/121; 365/183.1; 365/230.08
(58) Field of Search ............................. 700/12, 13, 23, 700/29, 30, 31, 117–121, 17–20, 83–88; 365/185.1, 230.08, 203; 379/201.03, 201.12; 345/179

(56) References Cited

U.S. PATENT DOCUMENTS

| | | | | |
|---|---|---|---|---|
| 3,760,369 A | | 9/1973 | Kemp | 340/172.5 |
| 3,918,030 A | | 11/1975 | Walker | 340/172.5 |
| 4,484,268 A | | 11/1984 | Thoma et al. | 364/200 |
| 4,594,651 A | * | 6/1986 | Jaswa et al. | 700/2 |
| 4,956,835 A | * | 9/1990 | Grover | 370/228 |
| 5,386,464 A | * | 1/1995 | Pruitt | 379/201.03 |
| 6,098,094 A | * | 8/2000 | Barnhouse et al. | 709/203 |
| 6,173,425 B1 | * | 1/2001 | Knaack et al. | 714/718 |
| 6,185,203 B1 | * | 2/2001 | Berman | 370/351 |
| 6,263,396 B1 | * | 7/2001 | Cottle et al. | 710/263 |
| 6,363,175 B1 | * | 3/2002 | Scheirer et al. | 370/480 |

OTHER PUBLICATIONS

Desautels et al., "New Instruction and Extended Instruction Handling", IBM's Technical Disclosure Bulletin, Jun. 1978, vol. 21, No. 1, pp. 201–202.

Moser Jr., "Increasing an instruction set without increasing word length", Electronics Engineer's notebook, Feb. 1975, pp. 114–115.

\* cited by examiner

Primary Examiner—Ramesh Patel
(74) Attorney, Agent, or Firm—Lisa K. Jorgenson; E. Russell Tarleton; Seed IP Law Group PLLC

(57) ABSTRACT

A method of fabricating or designing a control unit for electronic microcontrollers or microprocessors that includes fabricating a finite state machine having at least one combinatorial network, the finite state machine having a plurality of control sub-units, each structured to correspond to one combinatorial logic network. Each unit in the plurality of control sub-units is independently connected to an arbitration block to provide information about a possible future state and receive a present state command.

12 Claims, 28 Drawing Sheets

```
-------------uses the package----------
libarary CU_STATES
use STATES_CU.LISTS_CU.all
---------------------------------------- signal future_state : string;

-*******************************************
- Package states of the Control Unit
-******************************************* package lists_CU is
type string is (NEUTRAL,

-+++++++++++BLOCK_1_STATE+++++++++++++

IDLE,    FIRST,   SECOND

-+++++++++++BLOCK_2_STATE+++++++++++++

THIRD,   FIFTH,   SIXTH

-+++++++++++BLOCK_3_STATE+++++++++++++

FOURTH,  SEVENTH );

end lists_CU;
```

FIG. 3D

```
COMB_DECISION : process (state_ONE, state_TWO, state_THREE)

begin
if      (state_ONE =/ NEUTRAL)    then    new_state <= state_ONE;

elseif  (state_TWO =/ NEUTRAL)    then    new_state <= state_TWO;

elseif  (state_THREE =/ NEUTRAL)  then    new_state <= state_THREE;

else                                      new_state <= IDLE;
endif
end process COMB_DECISION
------------------------------------------------------------------------

MEMO_DECISION : process (RESET, CLOCK, new_state)
begin
if RESET = '0' then              absolute_state <= IDLE;

elseif CLOCK = '1' and CLOCK' event then
                                 absolute_state <= new_state;

endif;
end process MEMO_DECISION                                           3
```

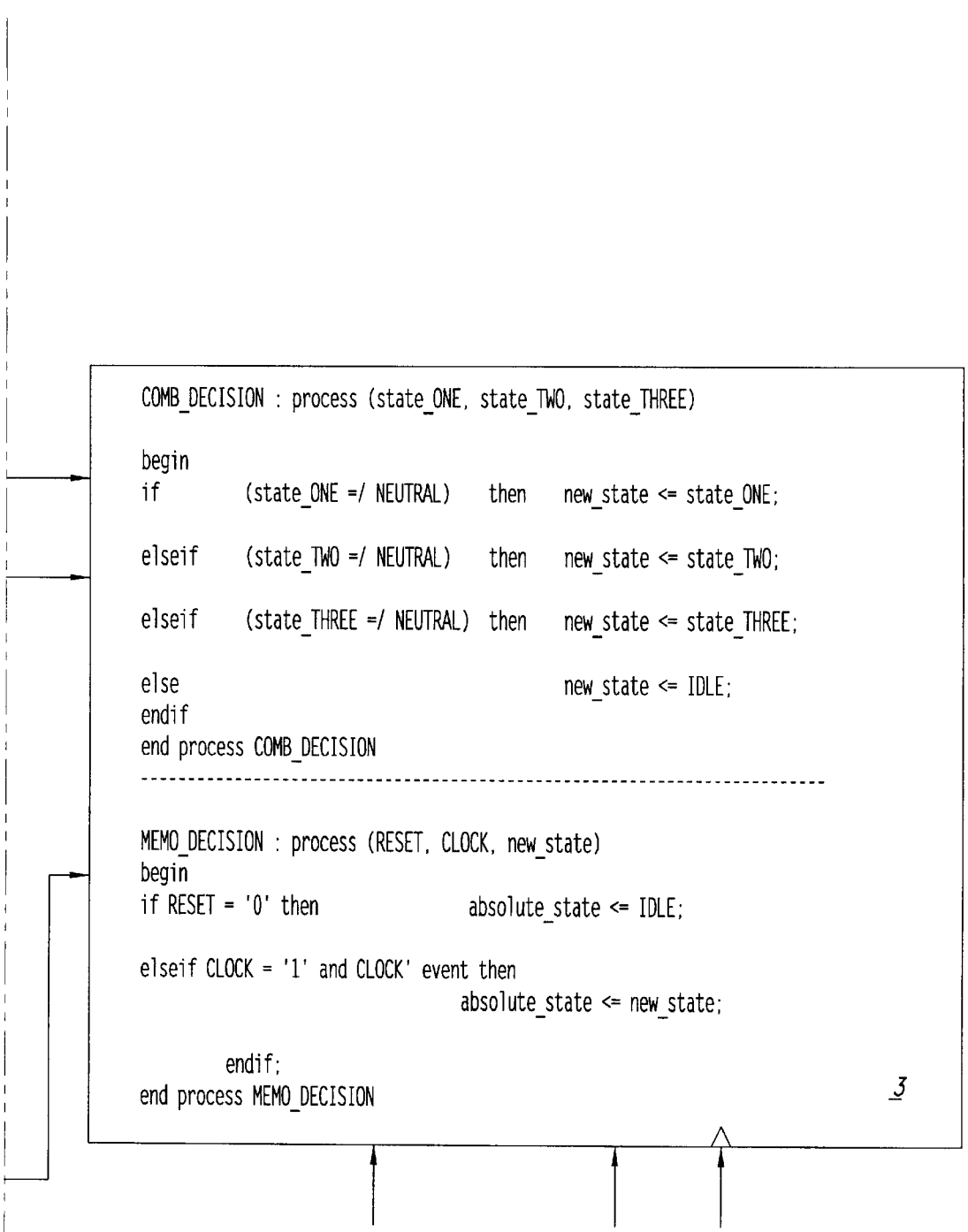

ABSOLUTE STATE      RESET    CLOCK

*FIG. 3E*

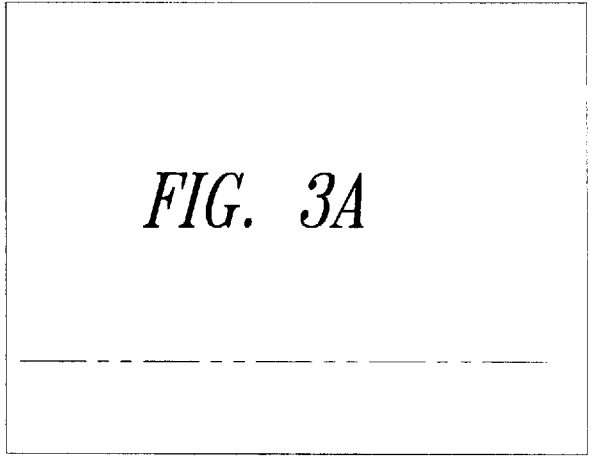
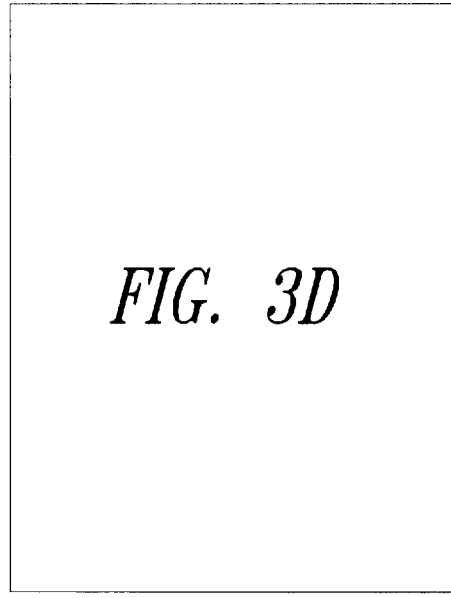
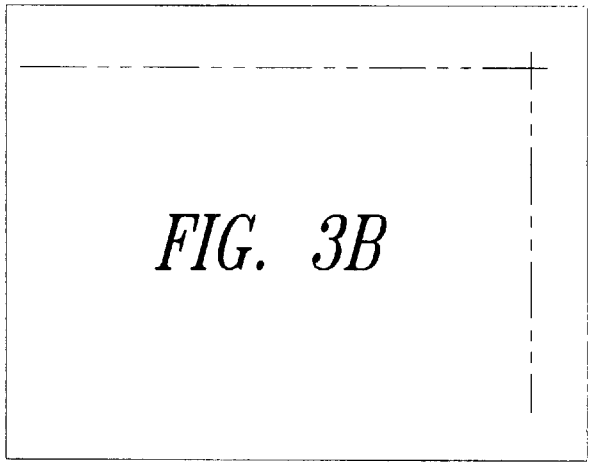
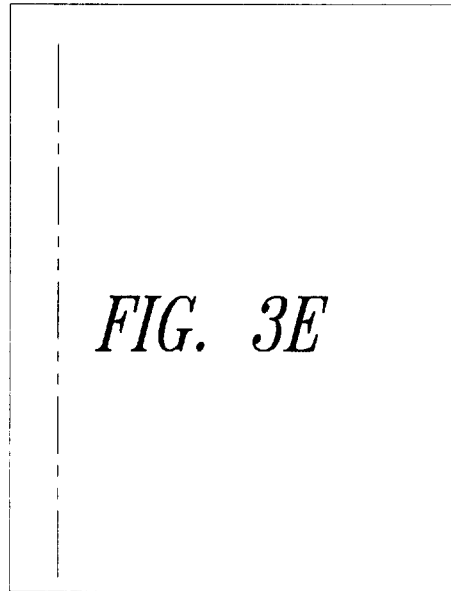
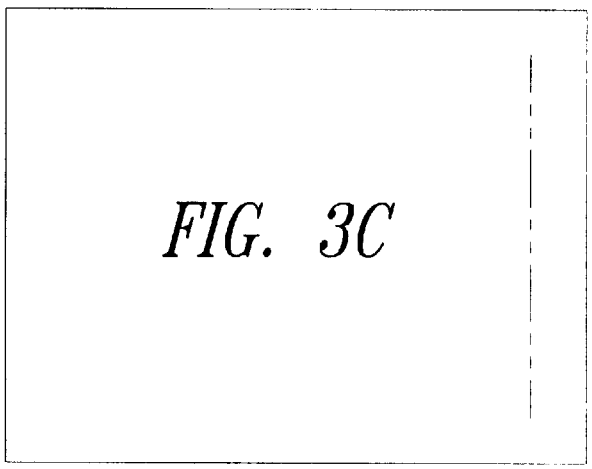

```
----------uses the package----------
libarary CU_STATES
use STATES_CU.LISTS_CU.all
---------------------------------------- signal future_state : string;

--*****************************************
-- Package states of the Control Unit
--***************************************** package lists_CU is
type string is (NEUTRAL,

--++++++++++++BLOCK_1_STATE++++++++++++++

IDLE,    FIRST,    SECOND

--++++++++++++BLOCK_2_STATE++++++++++++++

--++++++++++++BLOCK_3_STATE++++++++++++++

FOURTH,    SEVENTH  );

end lists_CU;
```

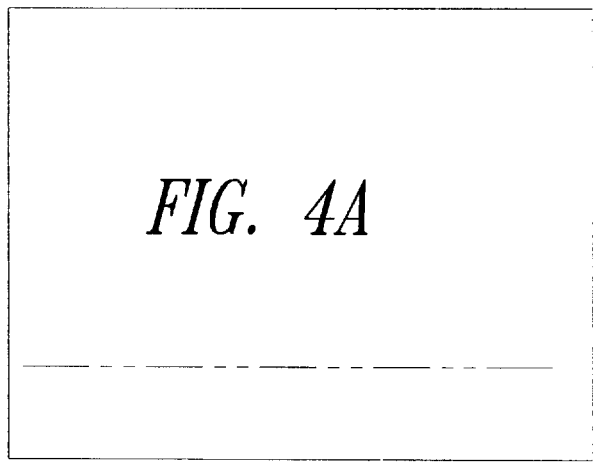
FIG. 4A
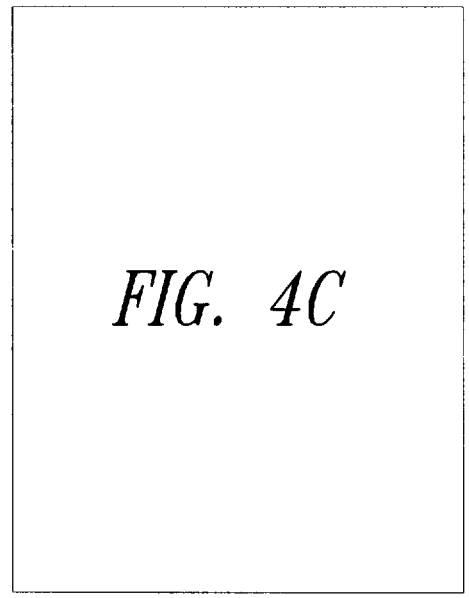
FIG. 4C
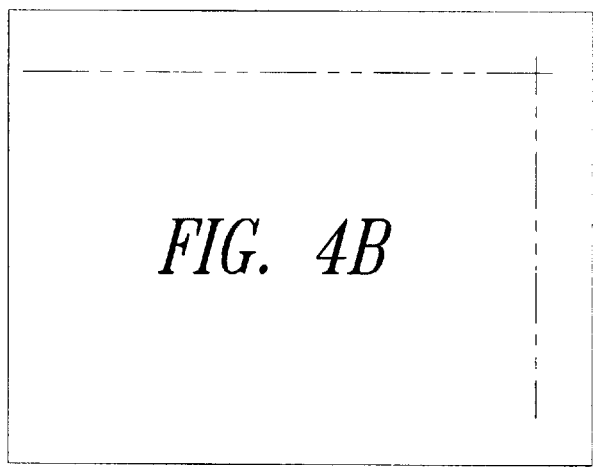
FIG. 4B
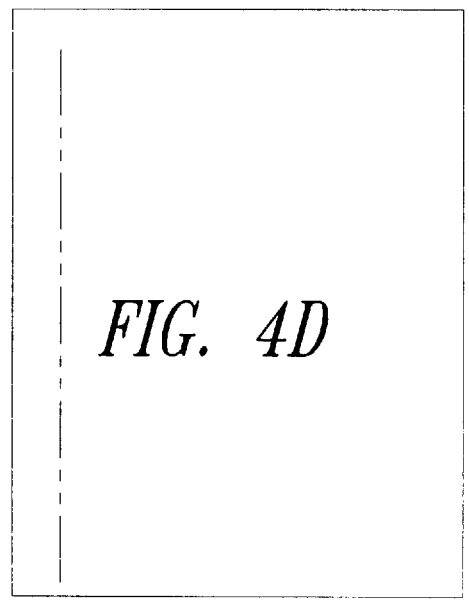
FIG. 4D
FIG. 4E

```
-------------uses the package----------
libarary CU_STATES
use STATES_CU.LISTS_CU.all
---------------------------------------- signal future_state : string;

--*************************************
-- Package states of the Control Unit
--************************************* package lists_CU is
type string is (NEUTRAL,

--++++++++++++BLOCK_1_STATE++++++++++++

IDLE,    FIRST,    SECOND

--++++++++++++BLOCK_2_STATE++++++++++++

THIRD, FIFTH, SIXTH

--++++++++++++BLOCK_3_STATE++++++++++++

FOURTH, SEVENTH, EIGHTH, NINTH );

end lists_CU;
```

*FIG. 6D*

```
----------uses the package----------
libarary CU_STATES
use STATES_CU.LISTS_CU.all
---------------------------------------- signal future_state : string;

--****************************************
-- Package states of the Control Unit
--**************************************** package lists_CU is
type string is (NEUTRAL,

--++++++++++++BLOCK_1_STATE+++++++++++++

IDLE,    FIRST,    SECOND

--++++++++++++BLOCK_2_STATE+++++++++++++

THIRD, FIFTH, SIXTH

--++++++++++++BLOCK_3_STATE+++++++++++++

FOURTH,    SEVENTH,

--++++++++++++BLOCK_NEW_STATE+++++++++++

EIGHTH,    NINTH,   TENTH );

end lists_CU;
```

*FIG. 7E*

FABRICATION METHOD FOR A CONTROL UNIT FOR ELECTRONIC MICROCONTROLLERS OR MICOPROCESSORS

TECHNICAL FIELD

This invention relates to an improved type of control unit for electronic microcontrollers or microprocessors, and, more specifically, relates to a control unit that includes a finite state machine having at least one combinational logic network. The invention also relates to a method of fabricating a control unit for electronic microcontrollers or microprocessors.

BACKGROUND OF THE INVENTION

Microcontrollers or microprocessors typically include: a resource-managing central block provided inside a so-called device "core", and a set of peripheral blocks connected to the central block.

The managing central block is commonly referred to as the CU (Control Unit). A CU unit oversees all the operative phases of the microcontroller or microprocessor, and clocks the carrying out of some internal operations.

In programmable devices, the CU performs, in principle, the exemplary operations including: pointing to a memory location which contains a program row to be executed; decoding the instruction thereof; carrying out the operations included in the decoded instruction; and pointing to the next program row.

The complexity of devices based on a microcontroller or microprocessor is increasing, and this reflects in the device having to carry out a larger number of different operations, among which are the following: transmitting data between the device and the outside; executing logic-arithmetic functions; conditional or unconditional skip operations, and subroutine calls; controlling interrupt signals; and establishing special flows of operations, as is the case with microcontrollers or microprocessors designed for special applications, such as dedicated microcontrollers for fuzzy logic computations.

Thus, when the number of instructions, and hence the computational capacity of the device to be designed increases, so does the hardware complexity of the CU. The unit becomes more complex because of the number of the instructions and the necessity to deliver the appropriate sequence of control signals for the device to operate correctly. Further, the CU must retain its capability to operate in an exclusive manner where special asynchronous interrupt signals are required.

Present designs for microcontrollers or microprocessors, as well as for ASIC (Application Specific Integrated Circuit) devices follow descriptive criteria.

In other words, the circuit, instead of being designed by connecting circuit-wise such standard sub-units as logic gates to perform certain logic operations (AND, OR, NOT, etc.) in order to provide complex functions of relational operators, is defined by means of a descriptive language based on peculiar syntax and semantics.

One of these description languages is known by the acronym VHDL (VHSIC Hardware Description Language, where VHSIC stands for Very High Speed Integrated Circuit). This language provides the designer with powerful tools for translating the notional idea into a functional description, simulating the block thus described, and for converting the behavior description into a RTL (Register Transfer Level) scheme, among other abilities.

The specifications for a block operation are formalized using the VHDL language in a listing. The integrated circuit design environments, such as those known in the trade as Cadence, Synopsys, etc., allow for the creation of symbols, their behavior description, and ensuing simulation. The latter is aimed at investigating the correct operation of the block just described.

A proper behavior description can later be translated to a RTL, using compilers which synthesize the circuit to obtain a schematic consisting of a set of elementary logic gates.

The exemplary designing method outlined hereinabove is currently widely used for progressing from the notional idea to a hard implementation. However, it cannot solve the problem of providing highly complex functions.

As would be expected, if the circuit is to perform many functions, the corresponding VHDL listing becomes very complex and exceedingly long.

In a simplistic way, it could be thought that this is merely a problem of listing size. Row-wise complex and bulky listings are indeed more difficult to set up, involve time-consuming checking procedures for servicing and modifying parts of it, and result in execution times which are directly proportional to their length in the respect of simulations and circuit "syntheses".

CUs provide a fair example of how the functional characteristics of a block turn into VHDL listings of a size and complexity which exceeds that of any other blocks within a microcontroller or microprocessor.

The overall construction of a FSM (Finite State Machine) basically comprises two combinational logic networks relating to the future state of the machine and the current outputs, as well as a sequential portion made up of a set of flip-flop memory cells for storing up given state vectors.

The combination of the inputs and the vector representing the "present state" of the state machine generates a "future state" vector that constitutes the data to be stored in the state memory cells. The outputs from these flip-flop cells retain the value of the present state, which is fed back to the combinational network for determining the value of the future state and is simultaneously supplied to a section of the current outputs. The output section issues new outputs of its own dependent on the present state, and occasionally inputs as well, as shown schematically in the accompanying FIG. 1.

Considering the complex circuit and functional aspects of a control unit, it can be appreciated that this prior approach using a finite state machine involves highly complex VHDL listings, especially with respect to the combinational networks.

Until now, no control units for microcontrollers or microprocessors have the necessary structural and functional features as to simplify the unit designing stage to the utmost degree and overcome the limitations of prior art solutions.

SUMMARY OF THE INVENTION

Embodiments of the invention split the control unit into a plurality of sub-units or assembly sub-units, each to perform a specific function, so that they can be fabricated independently and tested separately. In essence, the control unit is suitably resolved into classes and/or phases of operation whereby the complexity of each modular block in the whole unit can be effectively reduced.

Presented is a control unit for electronic microcontrollers or microprocessors that has a finite state machine having at least one combinational network. The finite state machine is constructed of a plurality of control sub-units that each corresponding to one combinational logic network. Each of the control sub-units are independently connected to an arbitration block that provides information about a possible future state and receives a present state command.

The features and advantages of a control unit according to the invention can be more clearly understood from the following description of an embodiment thereof, given by way of non-limitative example with reference to the accompanying drawings.

BRIEF DESCRIPTION OF THE DRAWINGS

FIGS. 3A–3F show schematically an embodiment of the control unit of FIG. 2.

FIGS. 4A–4E, 6A–6F, and 7A–7G are respective views of embodiments of the control unit according to an embodiment of the invention.

DETAILED DESCRIPTION OF THE INVENTION

Figure 1:
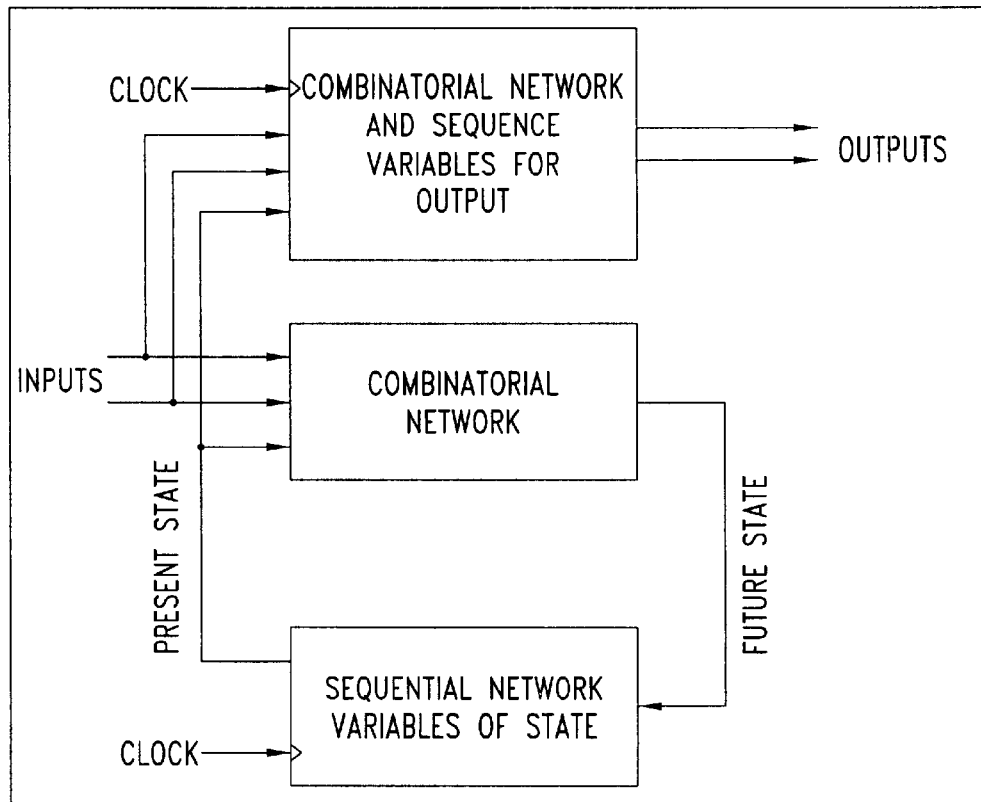
FIG. 1 is a block diagram of a conventional control unit incorporating a finite state machine.
Figure 2:
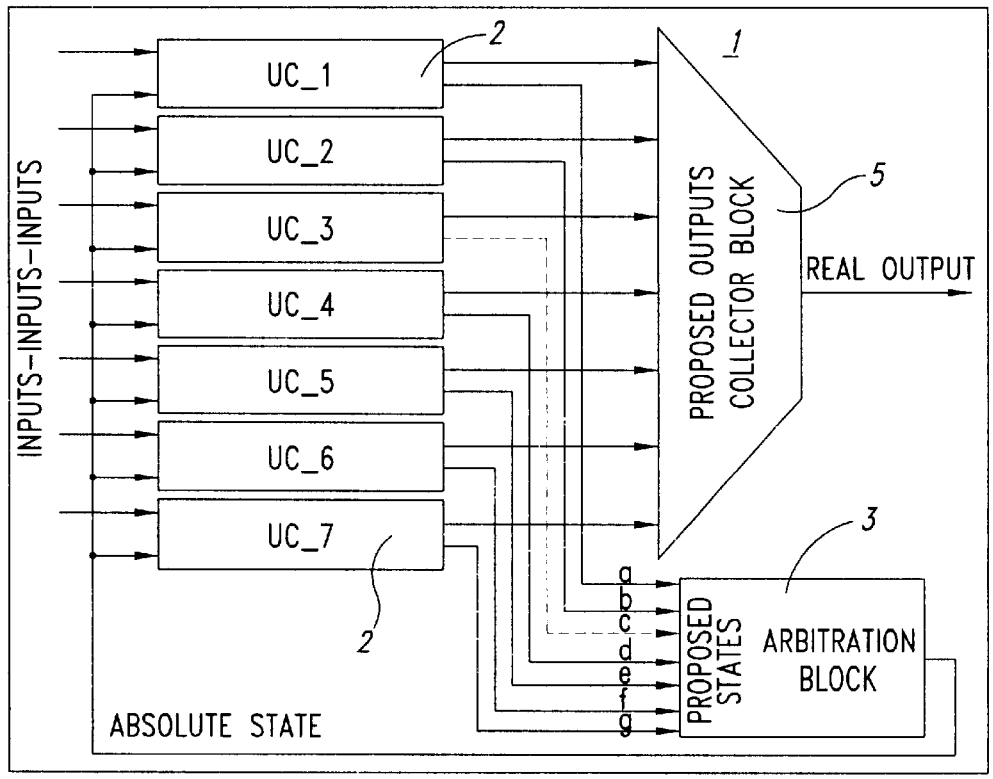
FIG. 2 is a block diagram showing a control unit according to an embodiment of this invention.

With reference to the drawing views, and particularly to the embodiment shown in FIG. 2, a control unit according to an embodiment this invention and useful with electronic microcontrollers and/or microprocessors is shown generally at 1.

The unit 1 is, particularly but not exclusively, intended for a fuzzy microcontroller manufactured by STMicroelectronics S.r.l. as model ST52E402, but embodiments of the invention are not limited to this example, as the invention has broad scope. This specification will cover examples from the above microcontroller for convenience of illustration only, but it is understood that the control unit 1 in this description can be used with any type of electronic microcontrollers or microprocessors.

The unit 1 is constructed of a number of control sub-units 2, denoted by the references UC_1, ..., UC_7, each adapted to be defined, fabricated or designed separately. An arbitration block 3 is arranged to oversee and control the operation of the several sub-units 2, as well as those operations which enable operation of even a single one of the sub-units comprising the control unit 1.

Advantageously in this embodiment, to prevent the arbitration block 3, as the decision-maker on the operations to be undertaken, from growing to be a complex circuit in itself, a particular management is provided for the various sub-units 2.

Each control sub-unit 2 is independently connected to the block 3, and supplies a predetermined value representing a state of operation to the arbitration block 3. This state may be an accepted one by the block 3 or be a neutral state.

The arbitration block 3 maintains the one possible state of operation.

Accordingly, the arbitration block 3 acts to relay signals. When the structure of this embodiment is regarded as the equal of a conventional finite state machine, it is as if each sub-unit 2 corresponded to a combinational logic network and the unit 1 comprised a plurality of combinational networks, one for each class of operations or instructions. The machine flow provides a set of states for each of the combinational networks. Each sub-unit 2 proposes, according to an instruction to be executed, a possible state of its own, and at any given time, only one of them will have its state coincident with one of those of the state vectors, with all the others in a so- called neutral state, designated NEUTRAL in the drawings.

The proposed states are collected by the arbitration block 3, which will decide on which of the sub-units 2 is to keep proposing the future state or stay in the neutral state. In addition, this- block 3 contains a sequential network 4 for storing the state vector.

Referring to FIG. 2, each sub-unit 2 represents a portion of the control unit 1 which is only activated when the absolute present state of the unit 1 is among those accepted by the sub-unit. In this case, the sub-unit 2 will independently produce all the control signals required for correctly executing relevant instructions or operations, and supply a future state of the whole unit 1.

If, on the contrary, the individual sub-unit 2 is not activated, it will propose a so-called NEUTRAL state.

All of the states proposed by the individual sub-units 2 forming the control unit 1 are connected to the arbitration block 3 which will allot the present state while taking into account the future state proposed by each sub-unit.

The respective outputs of each control sub-unit 2 are also connected to a current output collector block 5, which will select the single output having a value other than NEUTRAL.

For example, referring to FIG. 2, during the execution of an instruction which is included in the class of instructions relating to the third sub-unit UC_3 represented, the operations will be managed only by that control sub-unit UC_3. Thus, all the other sub-units 2 will supply the proposed state: a=b=d=e=f=g=NEUTRAL, and the single active signal to determine the present state, and hence the current output, will be the signal "c", i.e., the signal from the control sub-unit UC_3 involved.

The absolute state of the control unit 1 will match that determined by the sub-unit UC_3 until all the states relating to the execution of the standing instruction are completed. Also, this control sub-unit UC_3 will eventually propose a state that does not belong to it, and then enter the state NEUTRAL, so that the absolute state will be originated by the sub-unit 2, which takes over in the control. All of the signals required for correct operation of the whole control unit 1 are, therefore, then generated by the sub-unit 2 that takes over in the management; any other sub-units generating the same signals will supply non-influential neutral values inside the output collector block 5. In fact, the block 5 collects all the signals of common logic value, which will be ORed or ANDed together according to whether the active value is a logic 1 or 0.

Shown in FIGS. 3A–3F is an example of how the state signals are processed by the unit 1 as a whole. In this example, it is assumed that the control unit 1 can be broken down into three basic blocks, denoted ONE, TWO and THREE, only. Each block proposes a new future state for the whole control unit 1 by means of signals state_ONE, state_TWO and state_THREE. The arbitration block 3 processes these three signals and allots the correct absolute state upon receiving a successive active edge of a synchronization signal, e.g., a signal CLOCK, which represents the timing of the unit 1.

The accepted states by the control unit 1 (NEUTRAL, IDLE, FIRST, SECOND, THIRD, FOURTH, FIFTH, SIXTH, SEVENTH) can be defined by means of a defining block 6 designated "package". In the example of FIG. 3D, the package block 6 comprises a list of the sub-units 2 and is compiled, allotted to a library UC_states, and entered in each listing written in the VHDL code.

The string type, i.e., a variable formed of a set of alphanumeric characters, is defined within the package 6. In this way, it becomes unnecessary to set a binary code for each state beforehand. A device of a so-called Design Analyzer SYNOPSIS allots directly the relating code.

Thus, splitting the unit 1 into individual control sub-units 2 allows at least the following features: the designing job can be distributed among several people working independently of one another; shorter listings can be developed, and easier functional checking of the same; as well as a modular structure can be provided, so that each sub-unit can be regarded as an internal sub-unit of the unit 1. Sub-units such as these can be added or removed, and can be individually modified without involving the whole control unit 1.

It should be noted that the proposed modular structure is not addressed to provide a capability of reducing the complexity of the listings and/or the algorithms which describe the control unit at the behavior level, but that innovative aspects of the embodiments of the invention reside in the functional independence of each sub-unit 2.

The sub-units 2, being suitably divided among classes of instructions or operations, can be connected in or out independently, according to the user's requirements and the design specifications, without altering the architecture of the control unit 1.

The control unit 1 can be formed by just assembling together such basic sub-units 2 as will provide the required performance, thereby optimizing the overall silicon area required by the microcontroller.

Alternatively, where fabrication time is a prevailing consideration over area occupation, the architecture of the control unit 1 can be so laid out as to include the largest number of sub-units 2. Depending on the type of the application for which the machine is intended, a mechanism of activation/de-activation of the single sub-unit on instruction can be introduced.

Figure 3A:
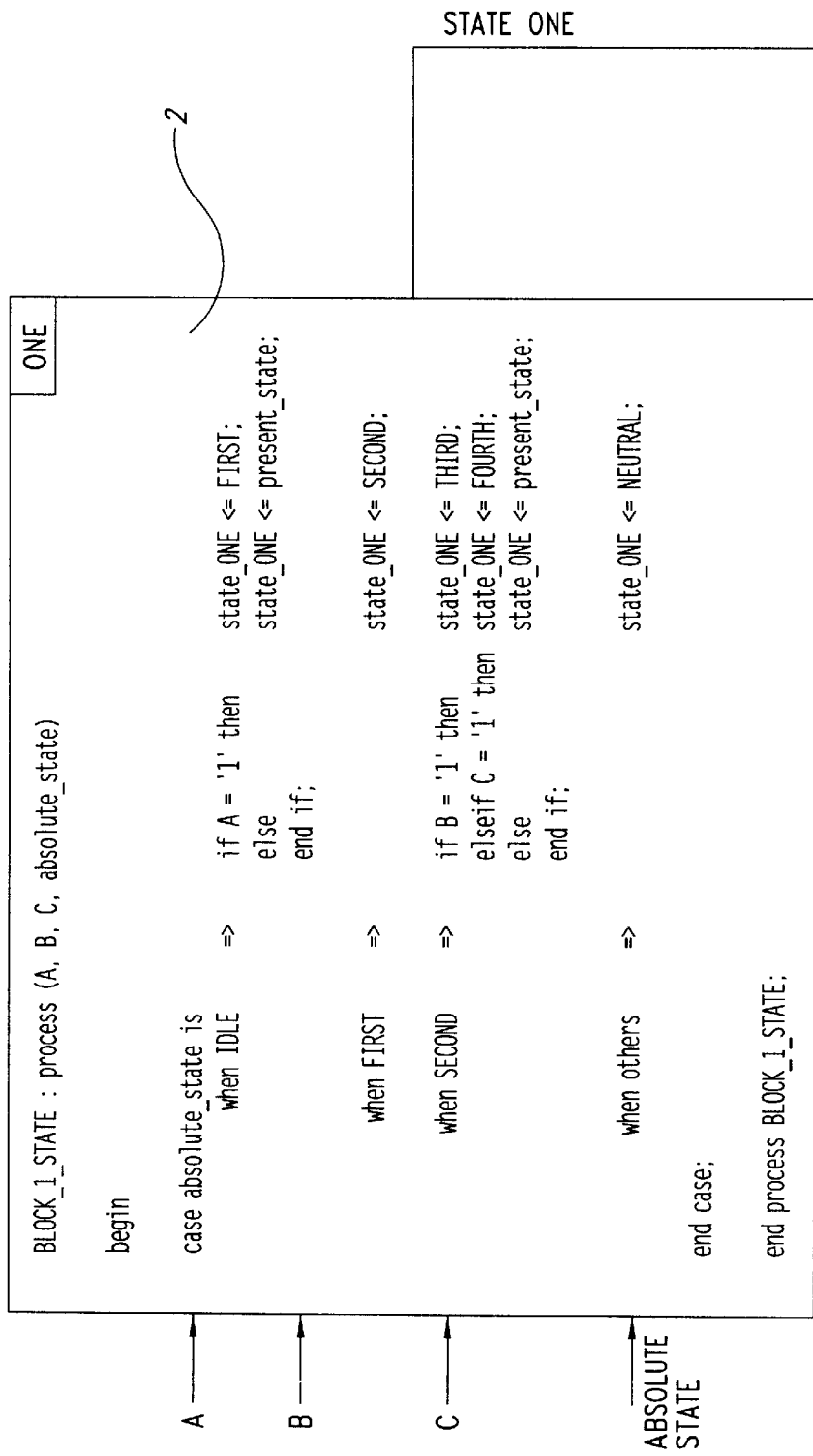
Figure 3B:
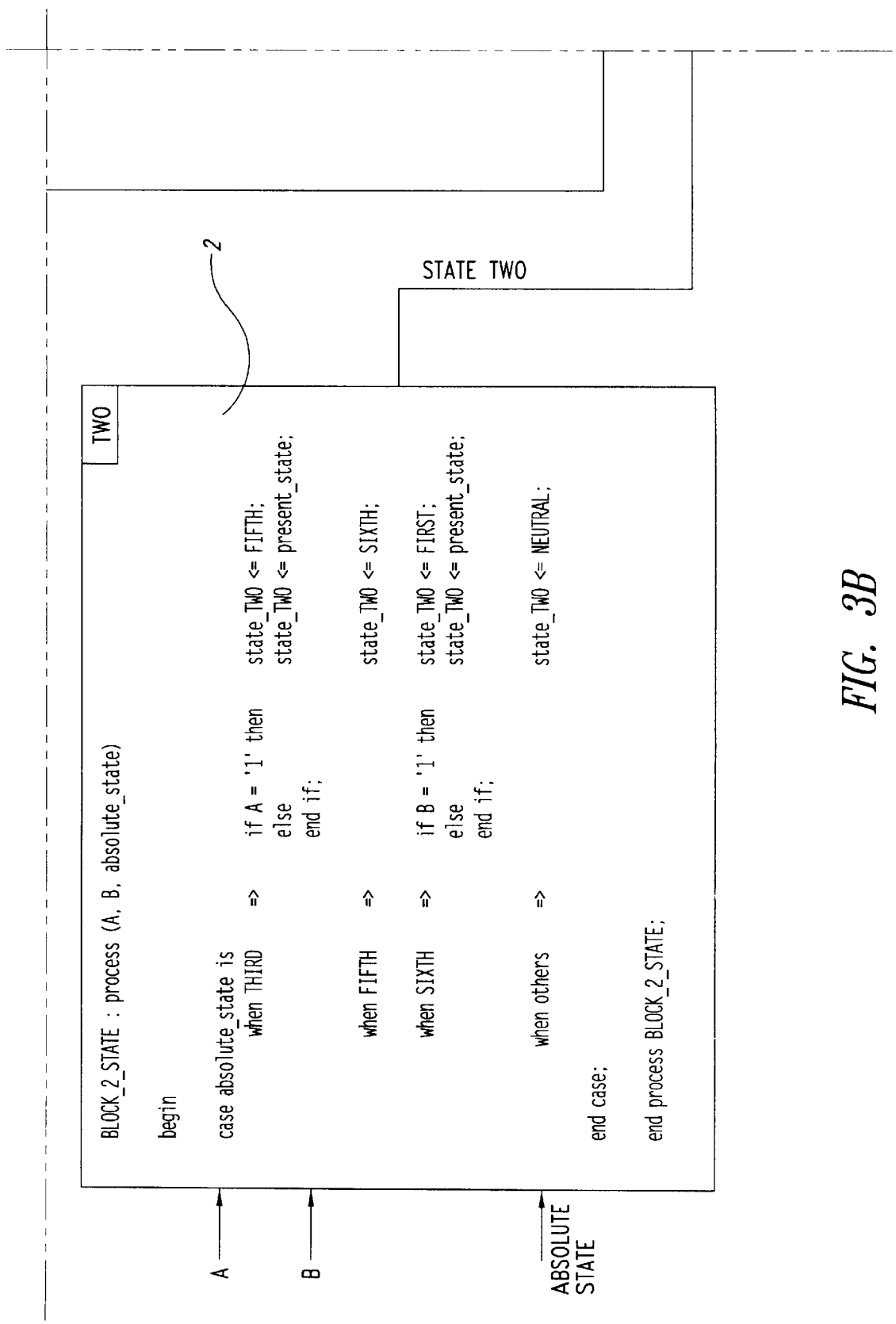
Figure 3C:
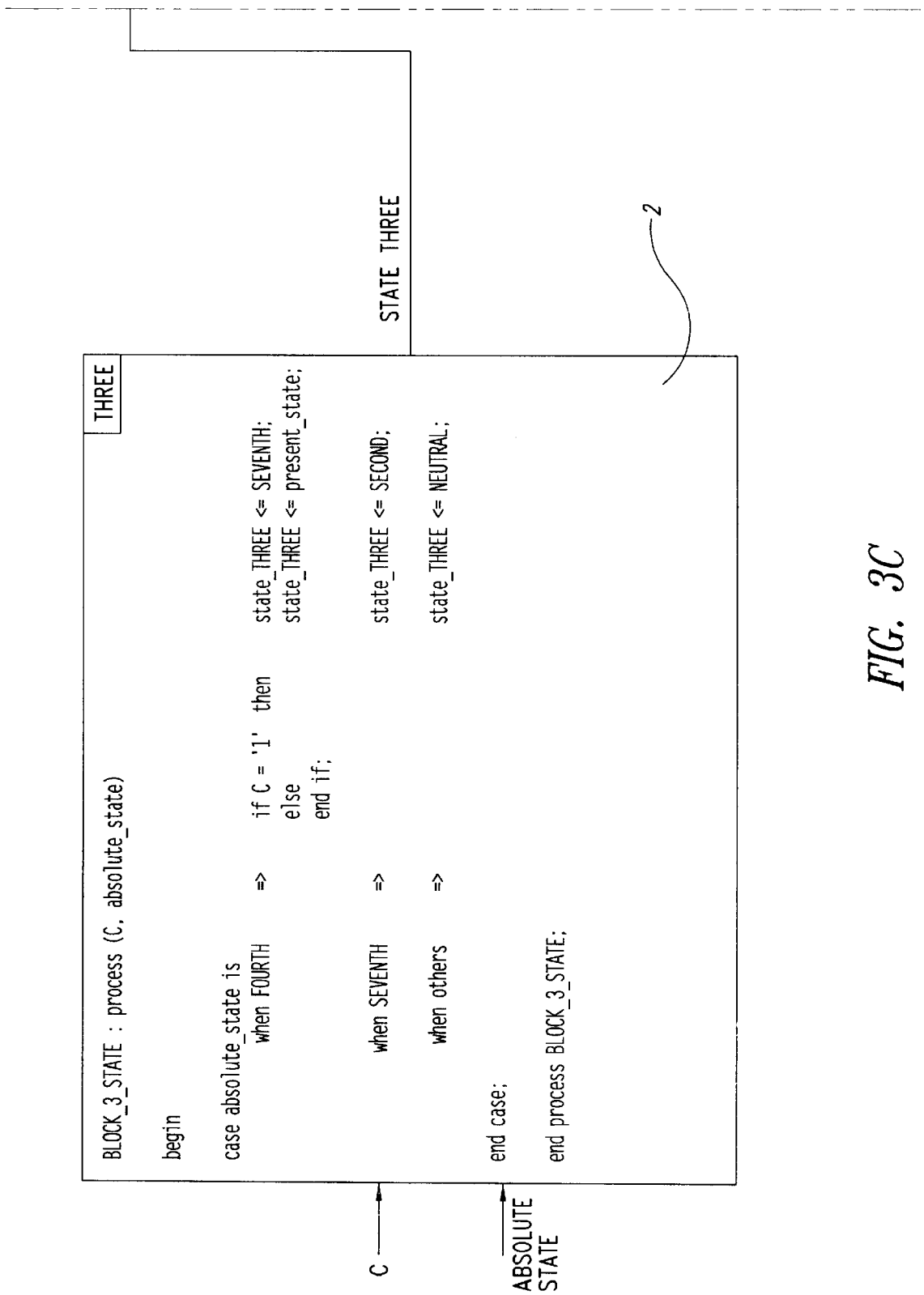
Figure 3G:
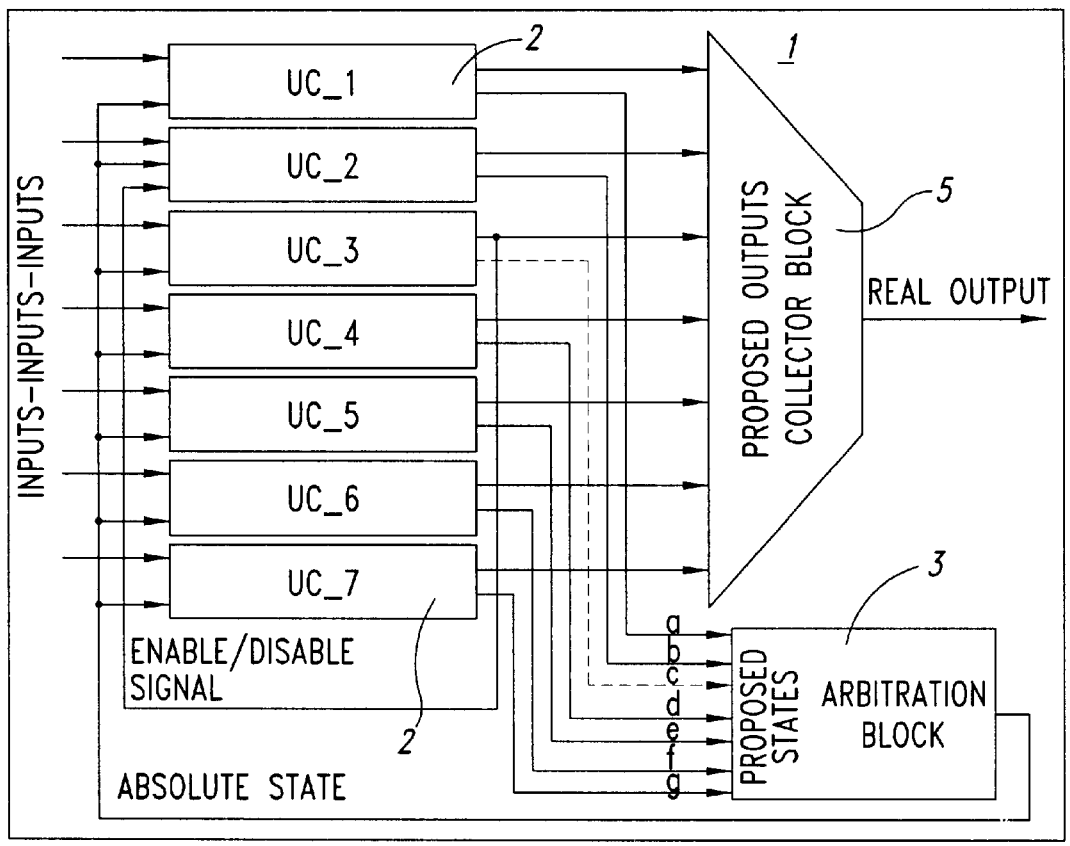
FIGS. 3G, 5 and 8 are respective block diagrams illustrating the unit of FIG. 2 in different configurations.

For example, referring now to FIG. 3G, the sub-unit UC_3 can generate an enable signal upon a dedicated instruction which allows the unit UC_2 to be activated when input thereto.

The sub-unit UC_2, when activated, will evolve according to the state sequence set therefor each time that an instruction included among those contained in the class processed by the sub-unit is invoked. Conversely, when de-activated, the sub-unit UC_will propose at its output the so-called state NEUTRAL, giving control over to another sub-unit.

This type of disabling obtained by means of a signal generated during operation, and therefore by the program, can also be provided by wiring the de- activation signal in the structure 1, where not all the class of instructions associated with the sub-unit are expected to be useful.

The control unit 1 offers several advantages in terms of the operations to be carried out in order to modify the unit when the latter is used within a class of products belonging to the same family.

The modifications are easily applied by virtue of the modular character of the control unit 1 lending itself for the addition or cancellation of one or more instructions and/or operations intended for execution.

In view of that the structure 1 has been used to develop the ST52E4XX family of microcontrollers/microprocessors by the Applicant, reference will be made to this family hereinafter.

Cancelling Instructions

An instruction can be cancelled by just acting on the sub-unit 2 which is to execute the corresponding set of instructions.

It will be recalled that each sub-unit 2 is used to execute a particular set of instructions.

Cancelling an instruction involves only acting on a single sub-unit, without altering the connections to the other sub-units. This results in the VHDL encoded listing being modified which describes the sub-unit at the behavior level, with no need to act on the schematic of the control unit 1.

Figure 4A:
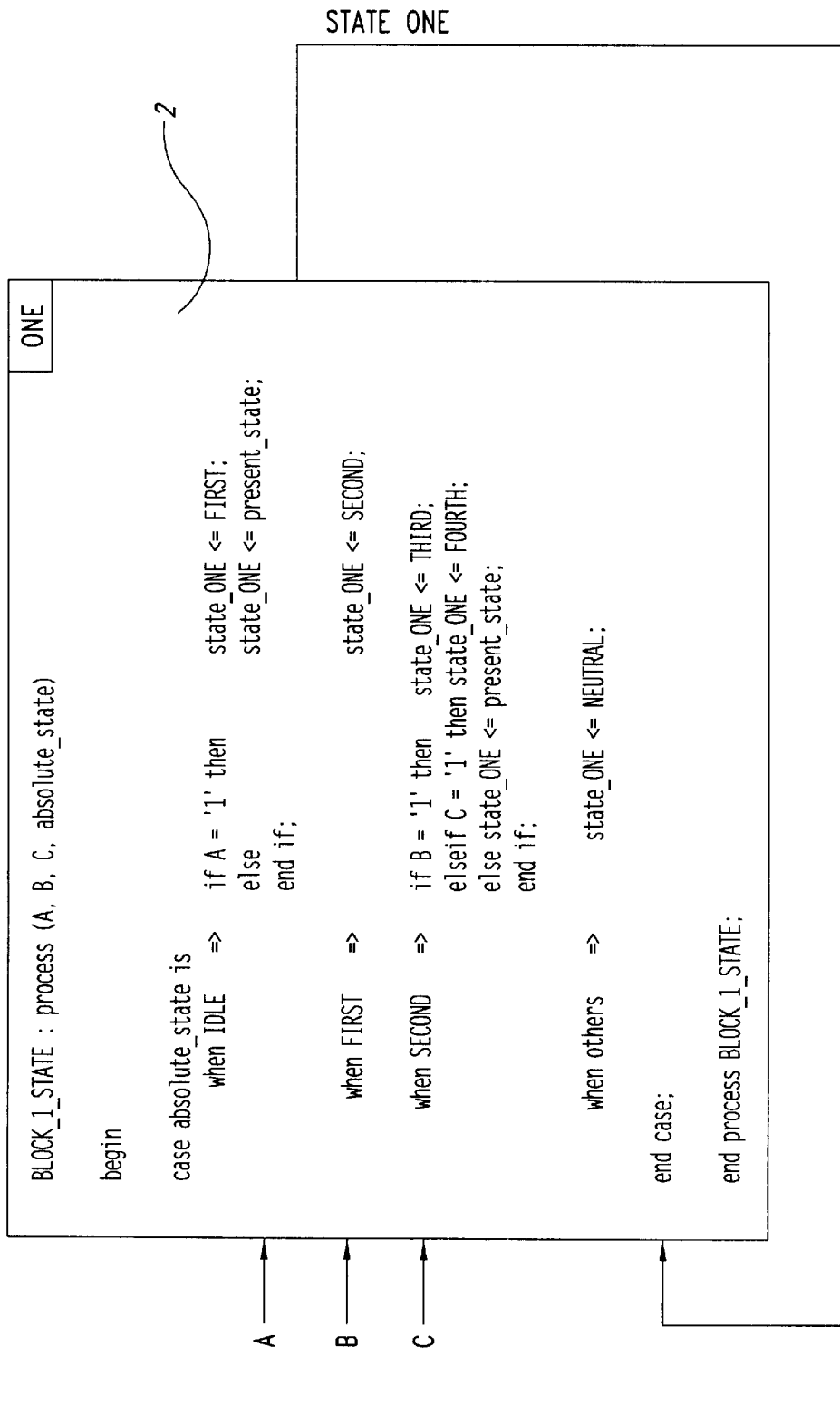
Figure 4B:
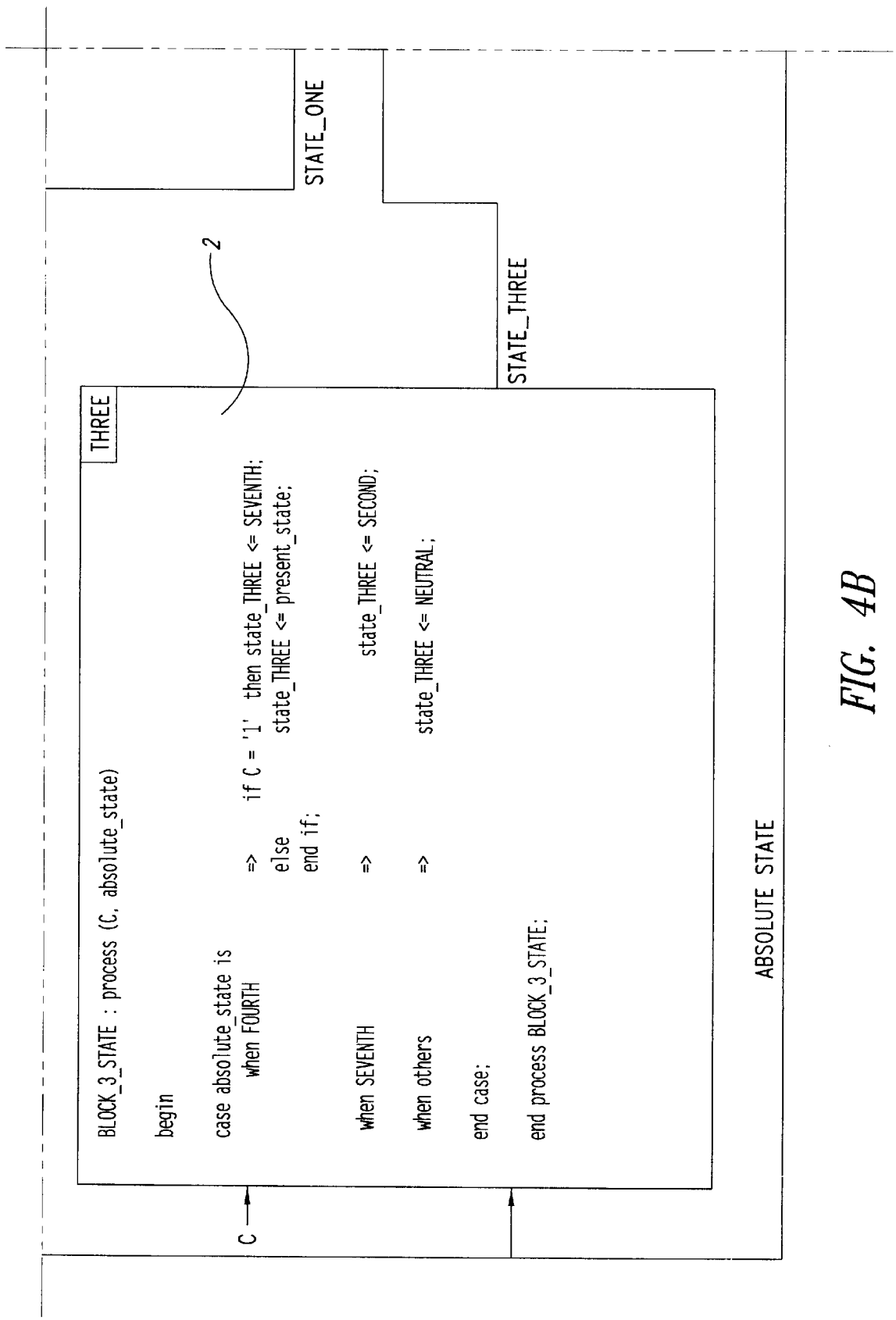
Figure 4D:
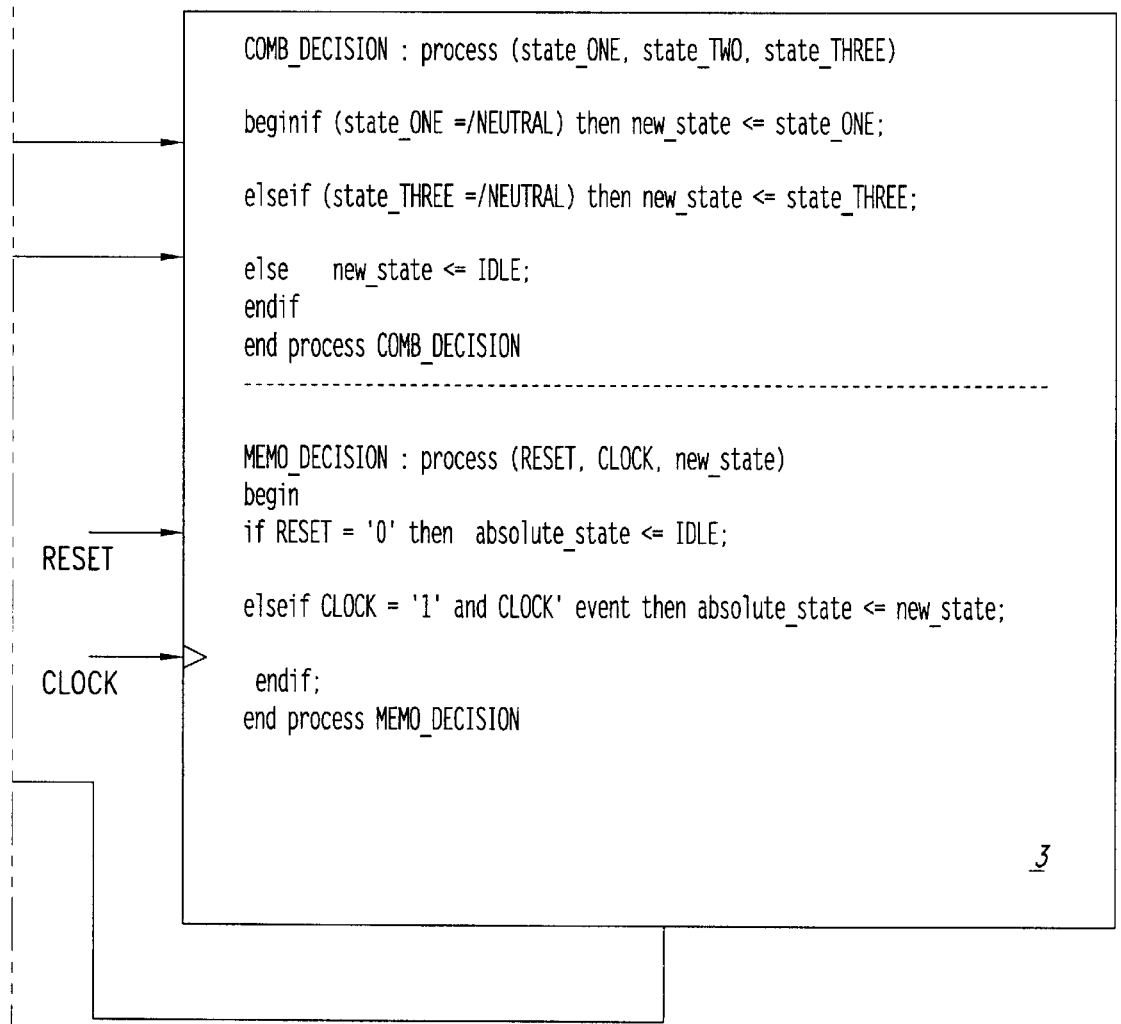

For example, assume that the set of logic-arithmetic instructions in a CU is to be reduced by removing the instruction MIRROR. With embodiments of the present invention, it will be sufficient to modify a sub-unit UC_ARITH_M6_TEST shown in FIG. 4, by removing the VHDL code row relating to the decoding (fetch) of the microcode word. Thus, it will suffice if the following rows are modified within the state ADD-AR1:

```
when ADD_AR1 =>
    if dok="1" then
        if word_1 = "0101" or NOT
           word_1 = "1001" or ASL
           word_1 = "1010" or ASR
           word_1 = "1100" or DEC
           word_1 = "1101" or INC
           word_1 = "1011" then MIRROR
              future state <= OPER;
        else
              future state <= STABIL_1;
        end if;
    else
        future state <= current state;
    end if;
    with the following code segment
when ADD_AR =>
    if dok = "1" then
        if word_1 = "0101" or NOT
           word_1 = "1001" or ASL
           word_1 = "1010" or ASR
           word_1 = "1100" or DEC
           word_1 = "1101" then INC
              future state <= OPER;
        else
              future state <= STABIL_1;
        end if;
    else
        future state <= current state;
    end if;
``` wherein the VHDL code row, relating to the decoding of the four LSBs of word-1 which identify the instruction MIRROR, is no longer present.

Likewise, it will be necessary to suitably cancel those code fragments which contain the decoding of word_1, or parts thereof, relating to the allotment of a given value for the sub-unit outputs. Thus, the listing should be searched for the occurrence of the row type:

if word_1="00101011" than, or parts thereof:

(if word_1(3 downto)="1011" then).

Since each sub-unit 2 in the control unit 1 of an ST52E402 controller allows the whole microprocessor or microcontroller to be managed independently of the other sub-units, to complete the removal of an instruction from the whole set, it is advisable to cancel within each sub-unit 2 (in the VHDL listing) the outputs generated by the removed instruction, which are present in the process relating to the output storing.

In particular, each sub-unit 2 is input the general synchronization (clock master) signal which causes all the outputs from the sub-units to be stored in flip-flops (preferably of the FD2 type, that is with asynchronous reset).

To minimize the requirement for silicon area resulting from the logic synthesis process, whenever an instruction is removed, those signals should be cancelled which are only generated by it in the process clocked by the occurrence of the synchronization signal and the presence of a re-initializing (reset) signal.

Likewise, where the removal of an instruction involves cancelling one or more states of the state machine FSM of the control unit 1, they should also be cancelled within one of the packages 6 entitled "CU_types", which must be "re-compiled" before the next logic synthesis using a Design Compiler.

Cancelling a Class of Instructions

A whole class of instructions can be effected by merely eleminating the sub-unit from the schematic of the control unit 1.

Shown schematically in FIGS. 4A–4E is an example, shown already in FIG. 3, relating to a control unit 1 which is divided into three sub-units 2, from which sub-unit TWO has been eliminated. This shows how, using embodiments of the invention, easy changes of configuration of a control unit are possible.

In this case, it will be necessary to also cancel all the signal branchings which formed inputs to the removed sub-unit, and the outputs. Among these outputs is the output designated state_TWO, which is input to the arbitration block 3, from where the code segment relating to the management of the signal state_TWO proposed by the removed sub-unit must be cancelled.

In a similar way, it will be necessary to cancel inside the package 6 the list of all the states of the state machine in block TWO; in the example, the states THIRD, FIFTH and SIXTH have been removed, with an attendant reduction of the sequential (flip-flop) network required to store the "state variable" of the finite state machine.

Figure 5:
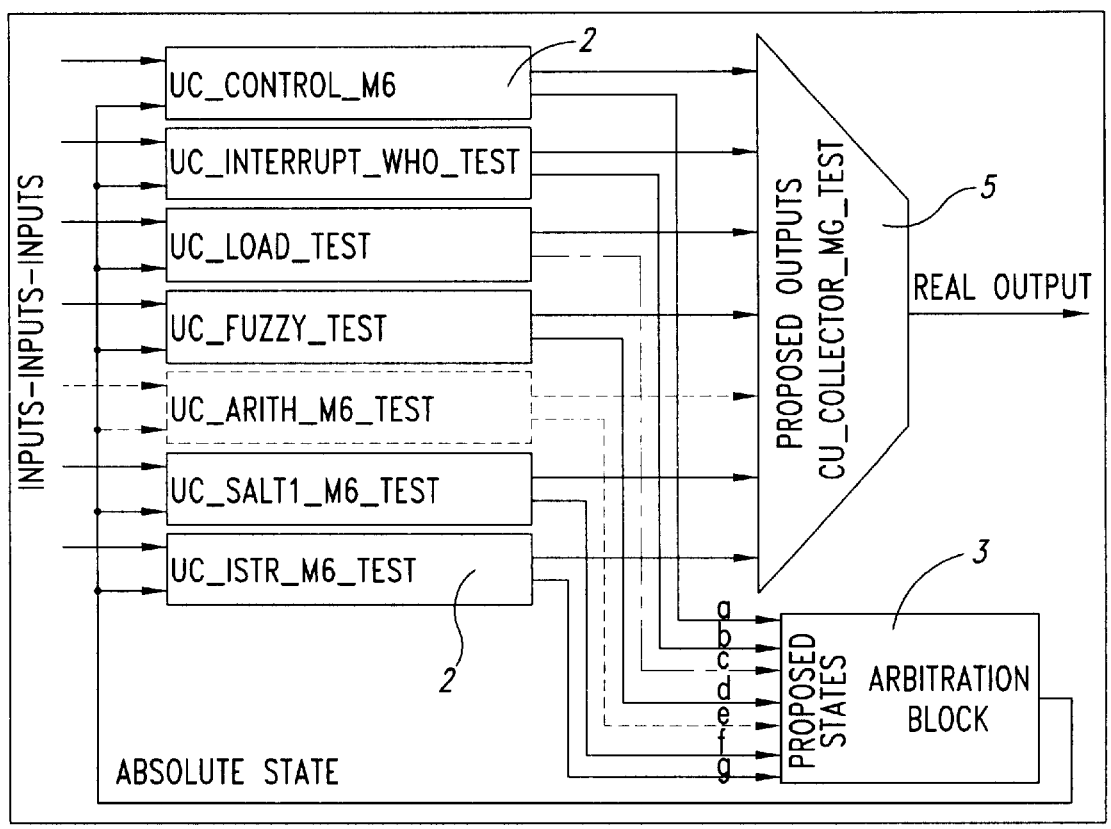
Figure 6A:
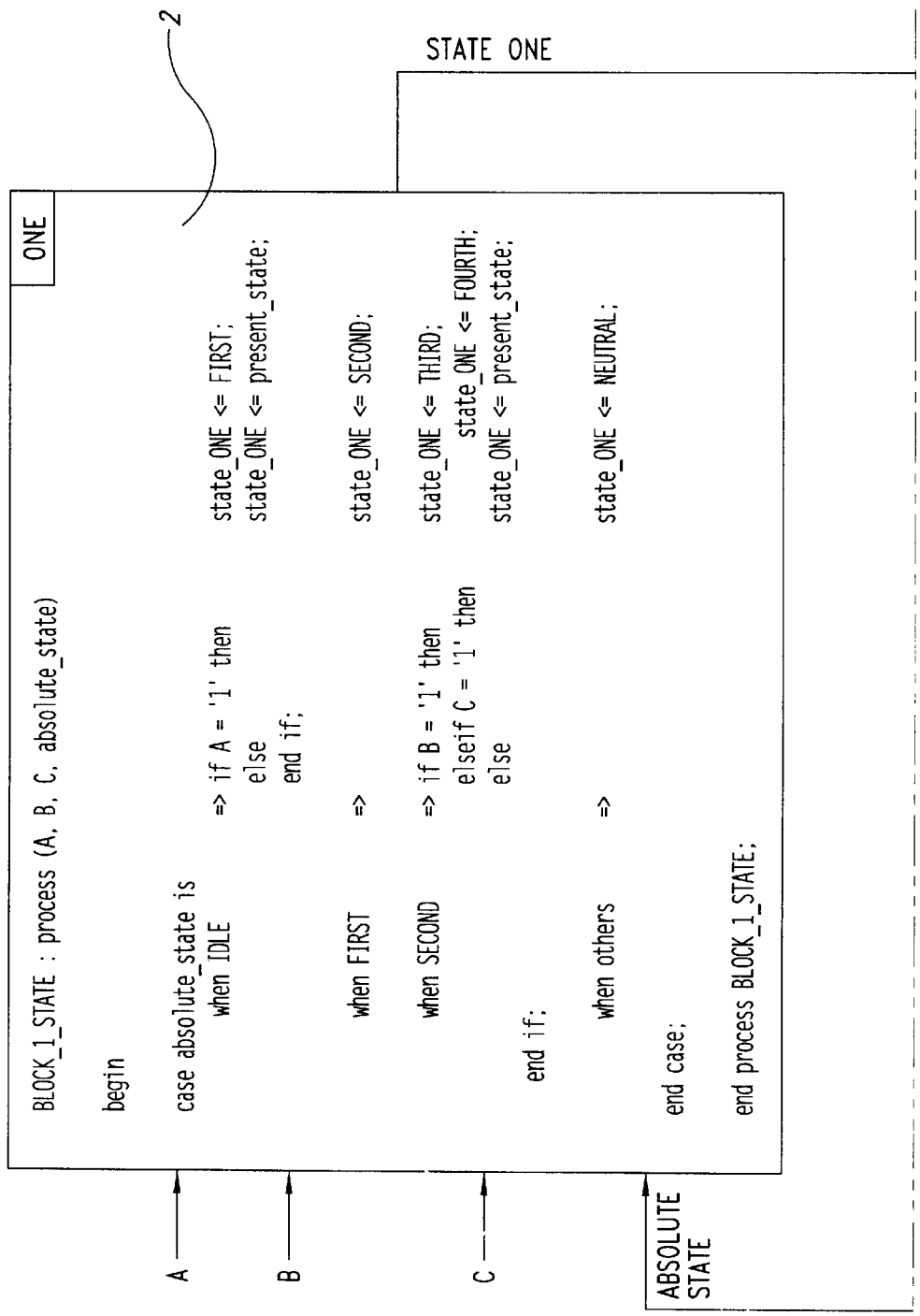
Figure 6B:
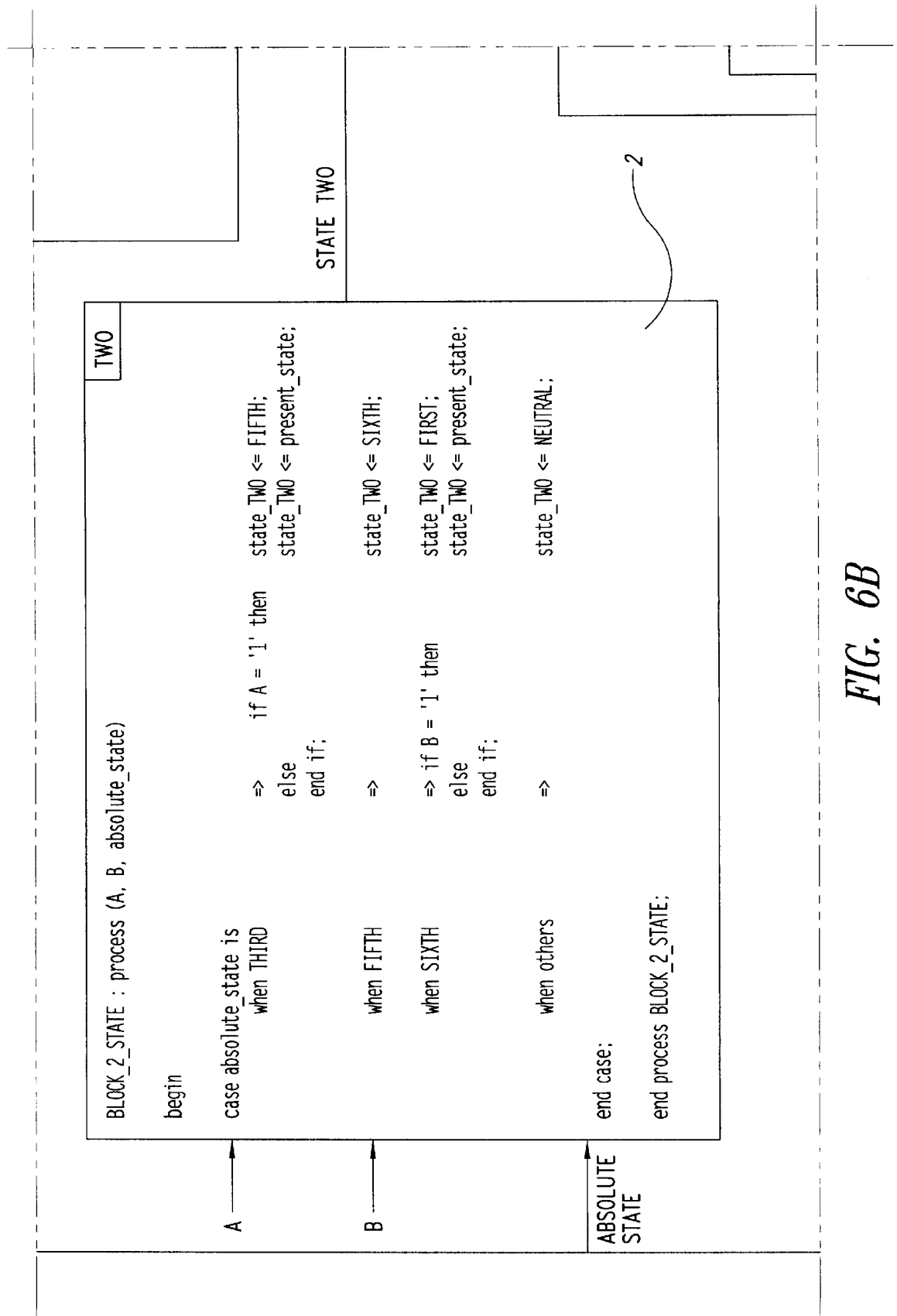
Figure 6C:
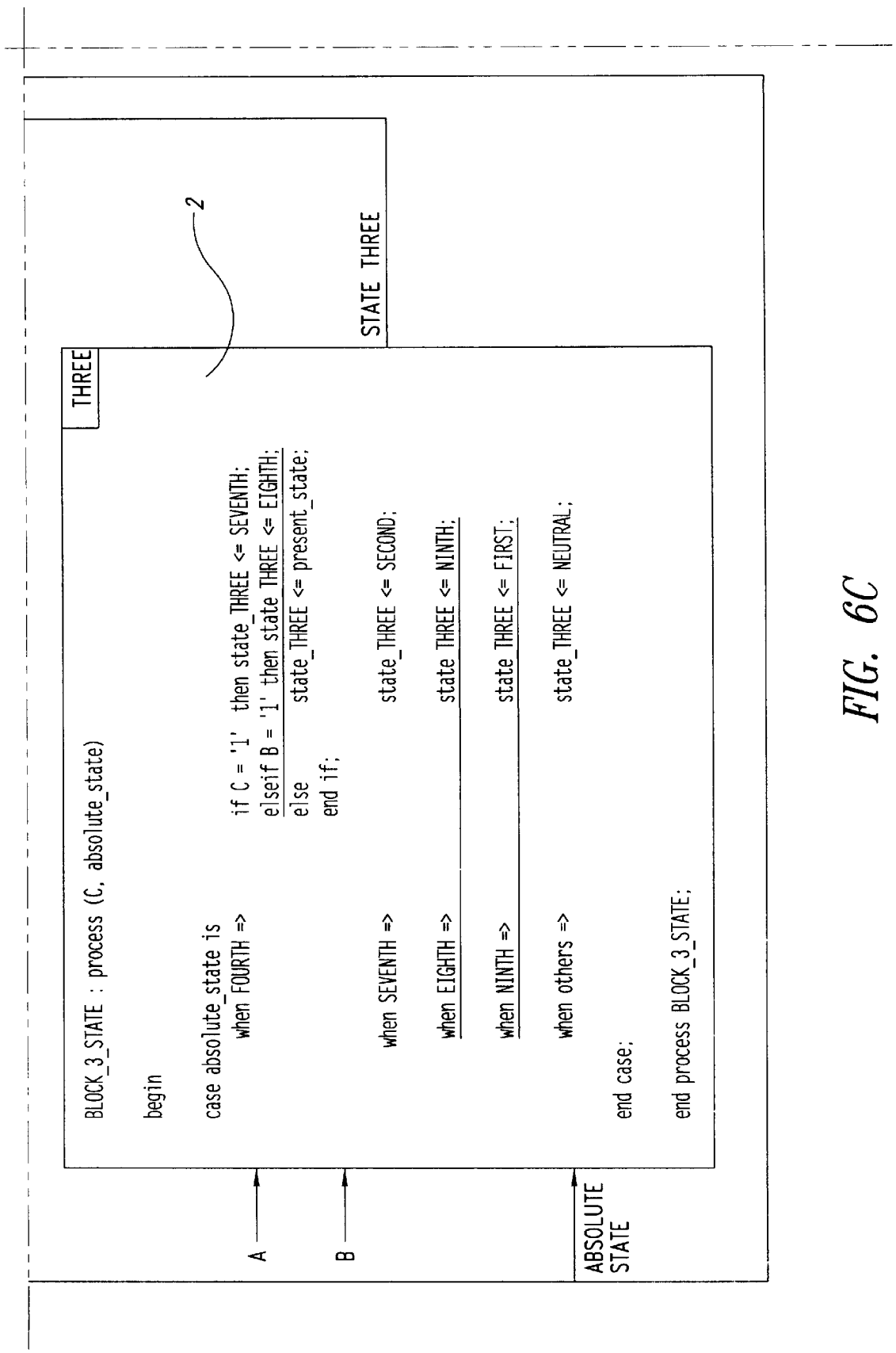
Figure 6E:
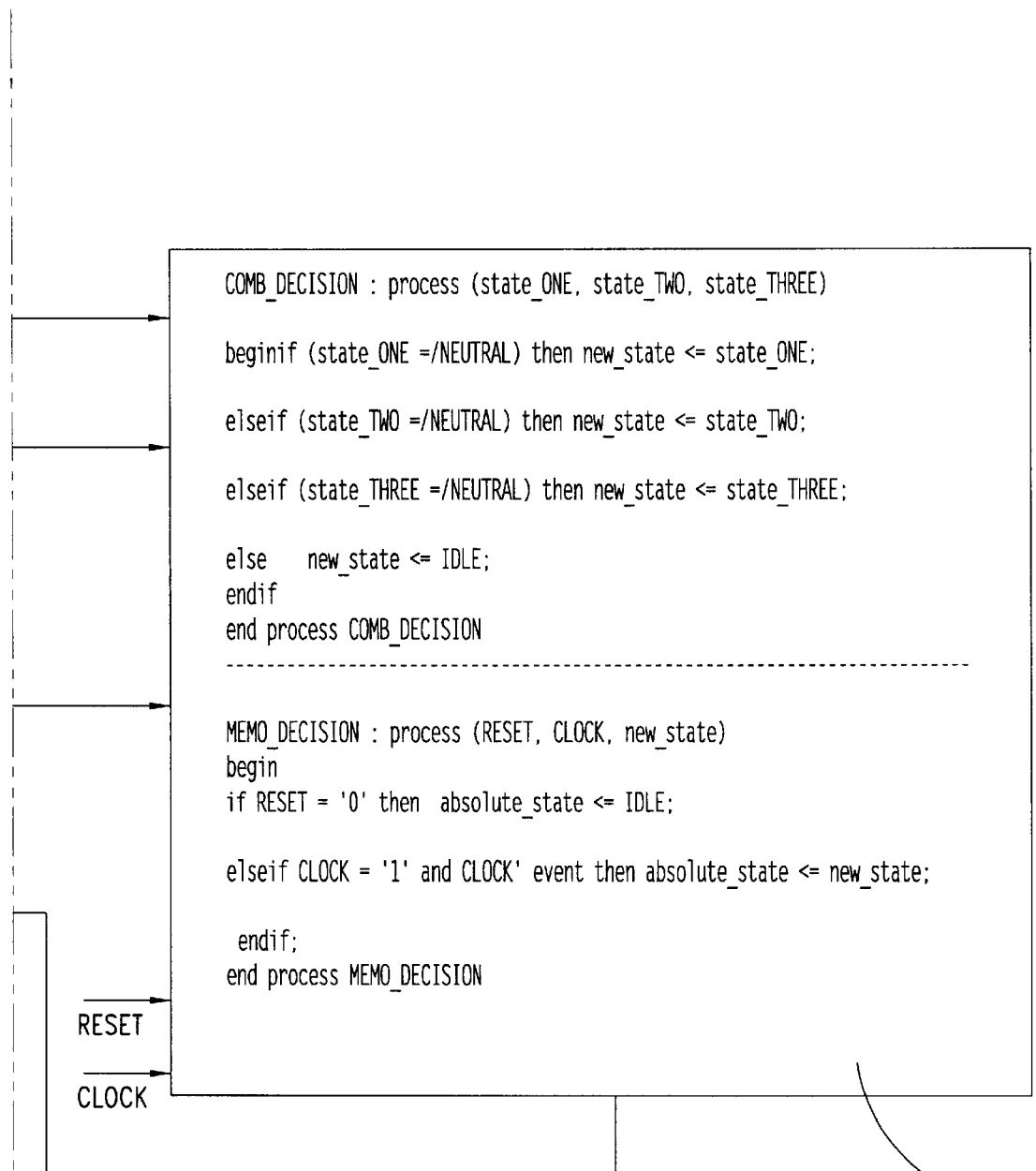
Figure 6F:
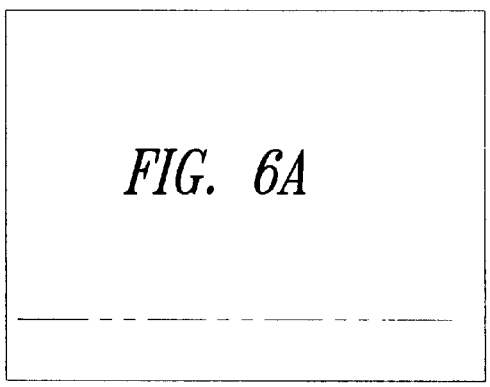
Figure 6F:
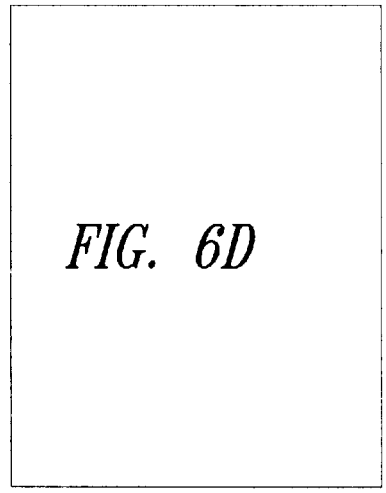
Figure 6F:
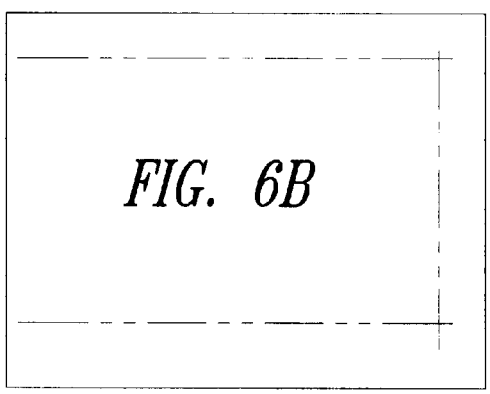
Figure 6F:
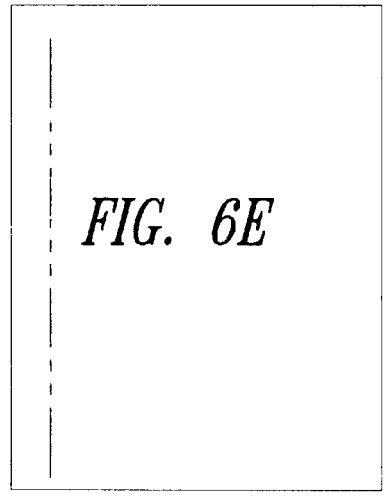
Figure 6F:
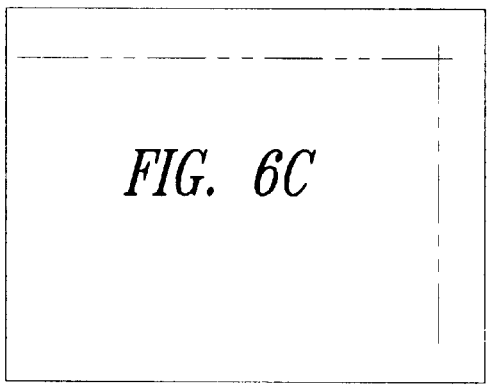
Figure 7A:
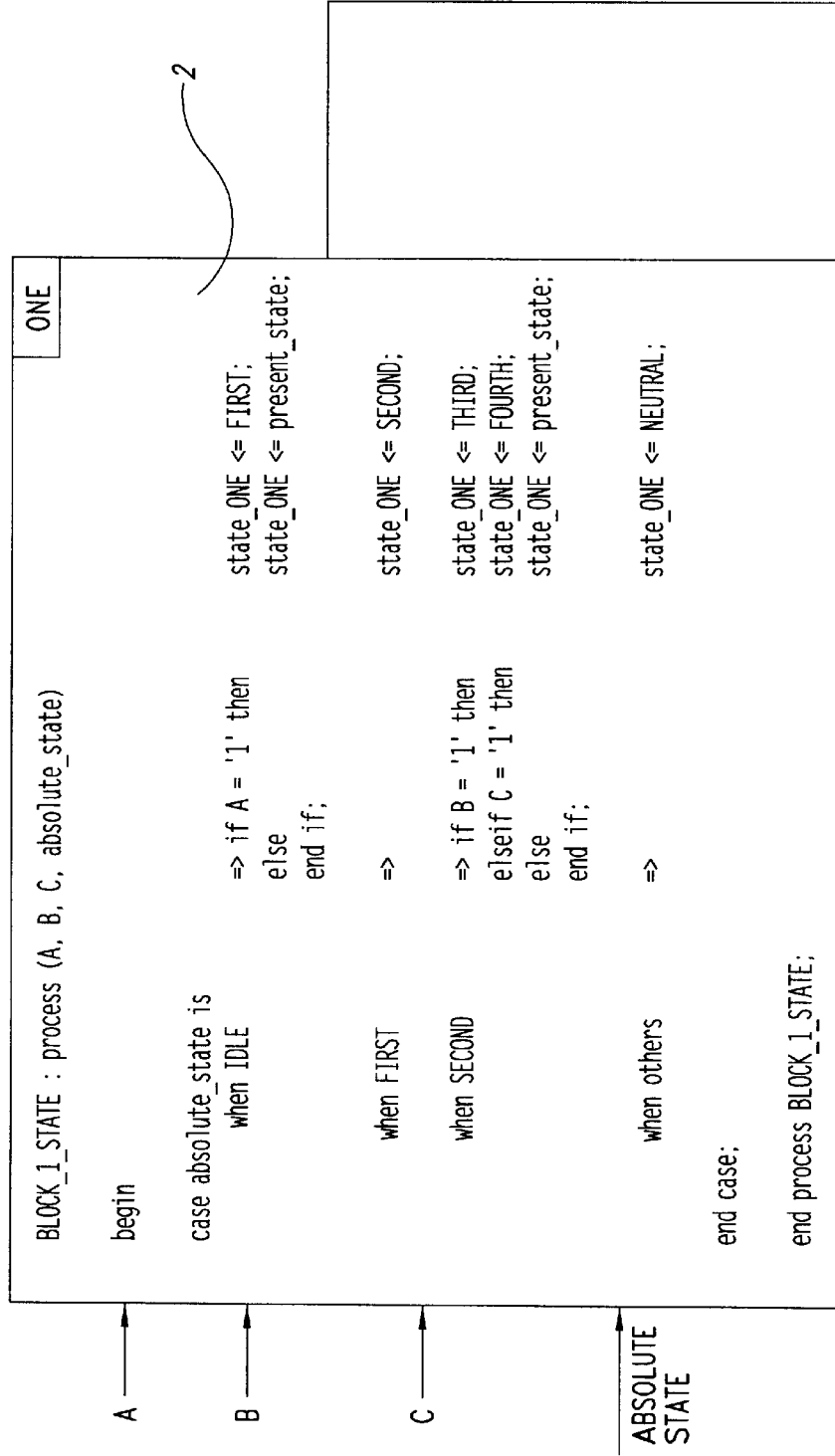
Figure 7B:
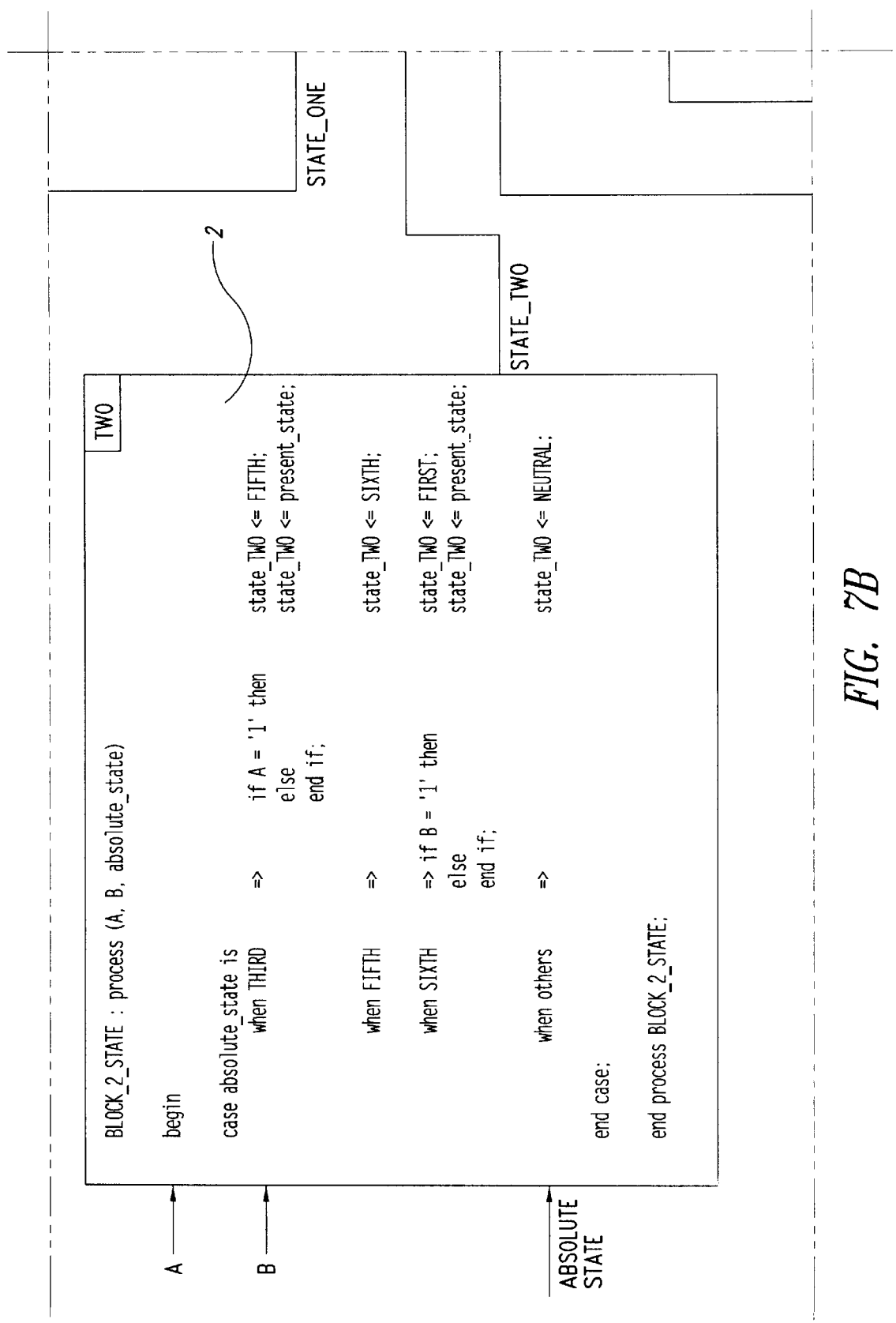
Figure 7C:
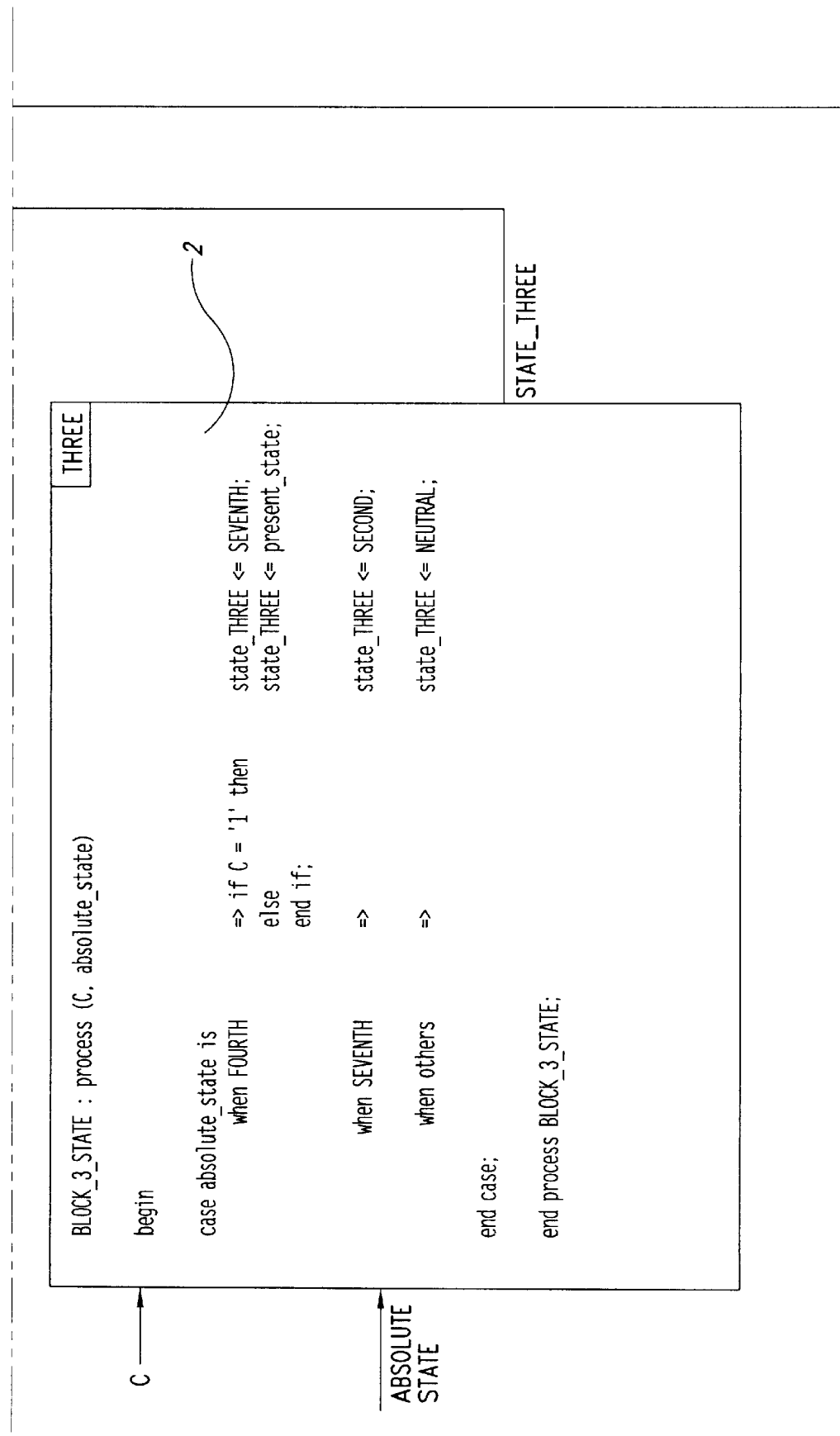
Figure 7D:
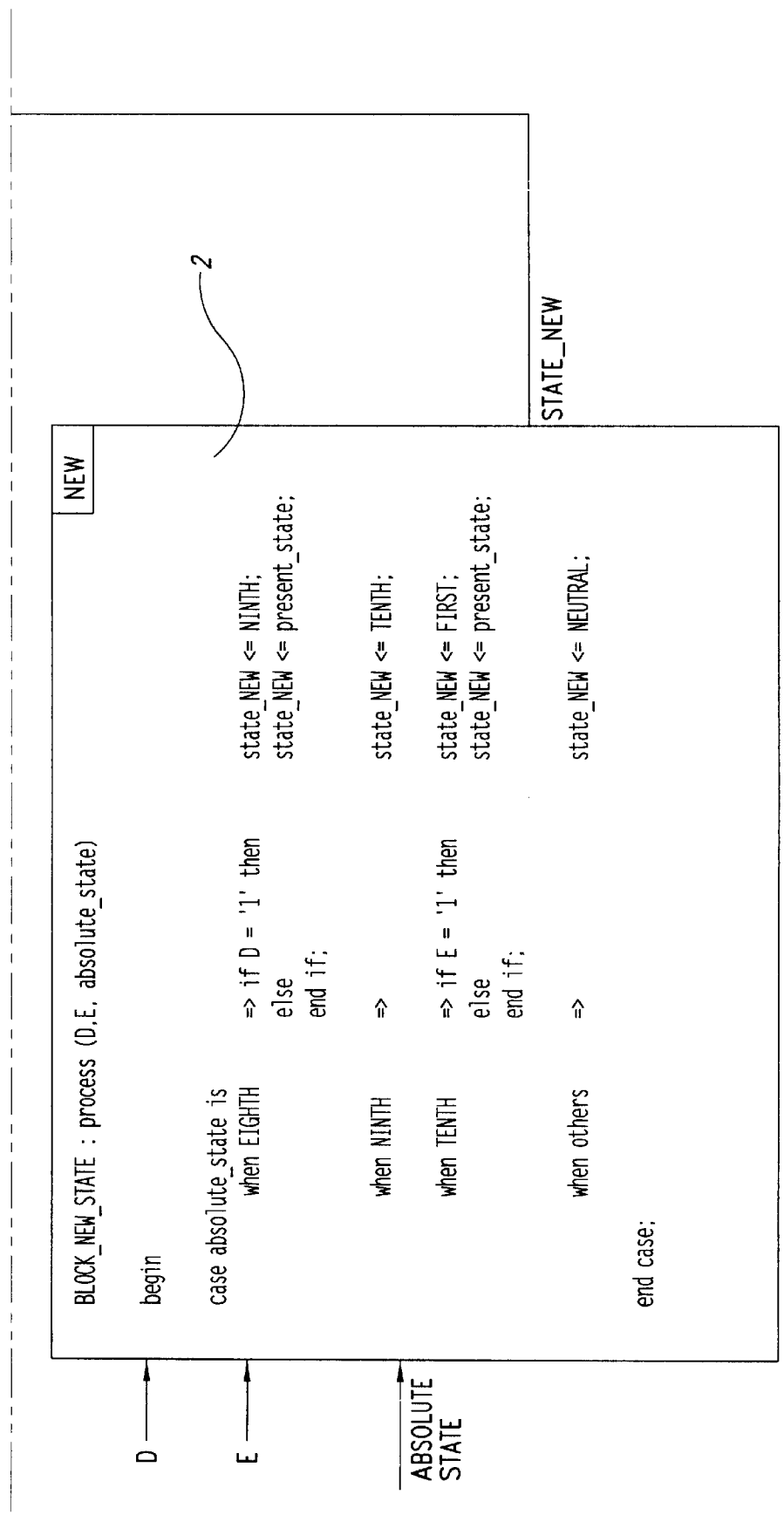
Figure 7F:
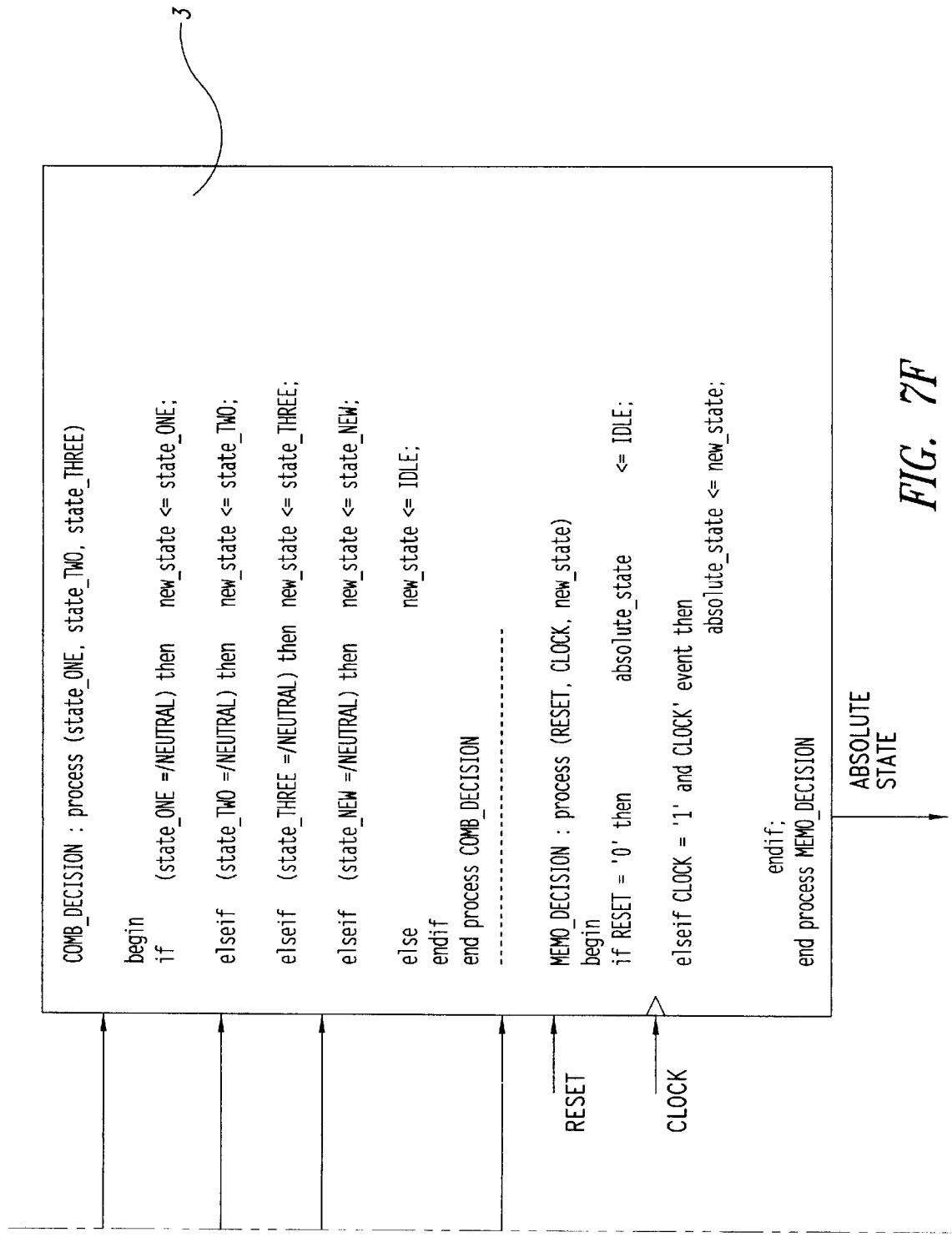
Figure 7G:
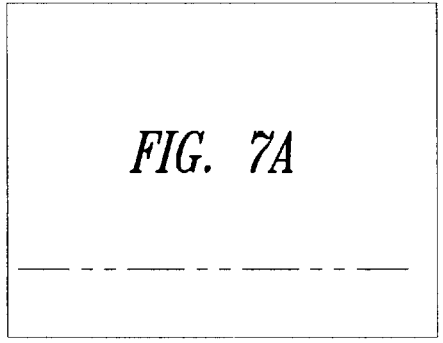
Figure 7G:
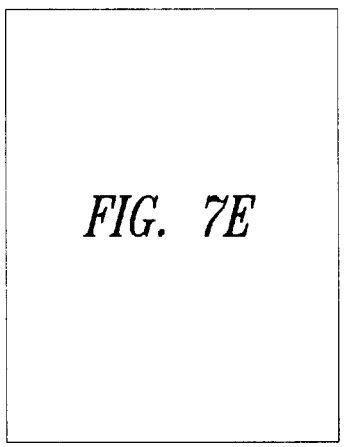
Figure 7G:
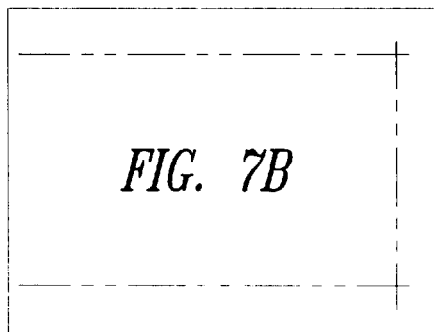
Figure 7G:
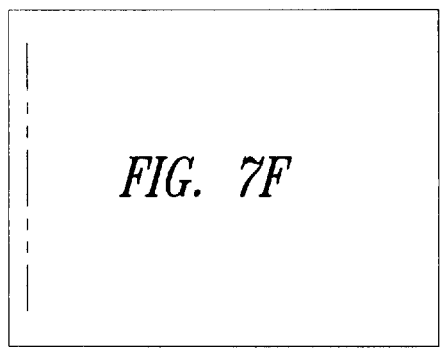
Figure 7G:
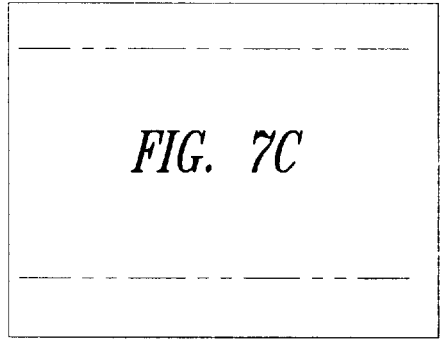
Figure 7G:
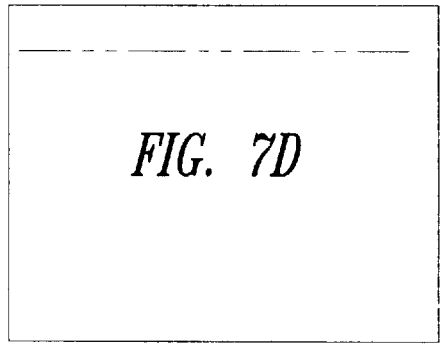

Referring to the diagram of the control unit 1 of the ST52E402 microcontroller shown in FIG. 5, where a whole set of logic-arithmetic instructions E is to be removed, for example, it will be sufficient to cancel from the schematic the sub-unit 2 entitled UC_ARITH_M6_TEST, (shown in dotted form to denote cancellation) together with the input and output signals, as described with respect to FIGS. 4A–4E. In addition, all occurrences of signals from the removed sub-unit should be cancelled within the associated collector block 5, entitled CU_COLLECTOR_M6_TEST.

In either instances of individual instructions or a whole class of instructions being cancelled, this may involve a reduction in the finite states defined within the package 6, which package should be compiled ahead of the logic synthesis.

Introducing Instructions

An instruction can be added to a class of instructions by merely including, in the VHDL listing that describes the sub-unit 2 to which the subject class is referred, the decoding of the new instruction, along with the states required for carrying out the operations provided by that instruction.

Taking the example shown in FIGS. 3A–3F, the addition of an instruction could involve, for example, the inclusion of an additional decoding (elsif B="1" then State_THREE<=EIGHTH;) and two new states (EIGHTH and NINTH) to the sub-unit THREE; it also being necessary to add these states to the related package (elenco-UC), as shown in FIGS. 6A–6F.

Introducing a Class of Instructions

A whole class of instructions can be added by merely including a new sub-unit 2 within the control unit 1.

A new sub-unit will generate a signal for a proposed state to the arbitration block 3 which conveys information about the newly introduced states. These states should be listed into the package 6 to be compiled before the logic synthesis.

For example, going back to the scheme proposed by FIGS. 3A–3F, assume that the sub-unit NEW is to be introduced, and that the process describing said sub-unit NEW at behavior level is responsive to two new signals (D and E), as shown in FIG. 7.

The addition of new functions to the control unit 1 results in the introduction of the new sub-units with the indicated inputs and the output state_NEW relating to the three new states: EIGHTH, NINTH and TENTH. These add to those already present inside the package elenco_UC 6, shown in FIGS. 7A–7G.

Any new output variables produced by the sub-unit NEW, if common with those generated by the other sub-units existing in the control unit 1, should be input to the block arranged to collect all the homolog outputs and render them unique.

Figure 8:
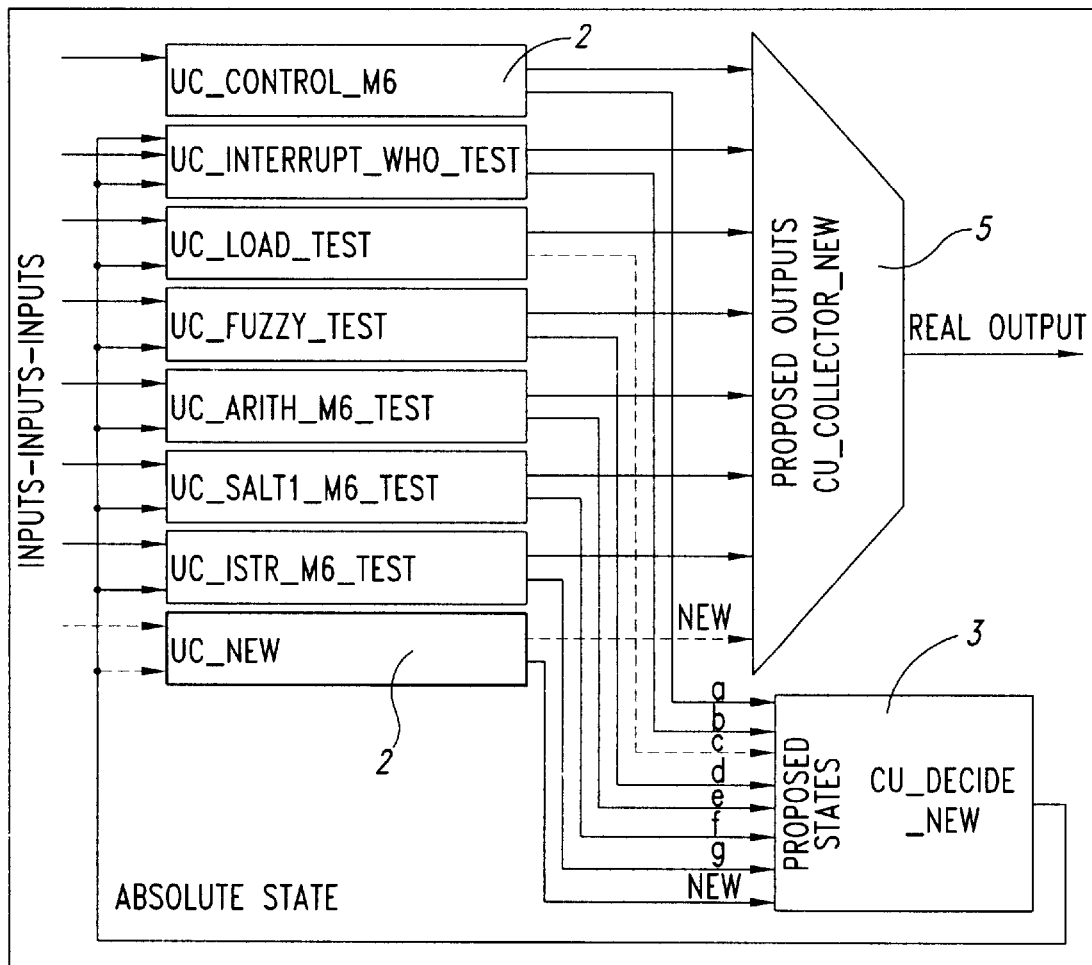

In FIG. 8, shown is an example of a sub-unit, designated UC_NEW, being added into the schematic of the current control unit 1. The new set of states is proposed to the arbitration block 3 entitled CU_DECIDE_NEW, and simultaneously, all the output variables in common with the other sub-units are supplied to the collector block 5 entitled CU_COLLECTOR_NEW, which will unify them:

Also in the instance of instructions or a class thereof being introduced, the package 6, (shown in FIG. 2) created to contain the list of the states, is to be modified where the additional instructions are formed from a flow of states that were already present in the state vector.

The solution proposed by this invention has been used to implement a control unit in an ST52E402 microcontroller wherein each block had been formed by the "finite state machine" method.

For example, the control unit of ST52E402 was to manage:

11 loading instructions;

14 logic-arithmetic instructions;

9 skip and/or subroutine call instructions;

8 interrupt managing instructions; and further special instructions and pseudo-instructions for fuzzy computation.

Were this control unit formed as a single block, like in the prior art, this would have involved the formation of a single large listing difficult to check, modify or complete.

By contrast, forming the control unit as single sub-units 2, in accordance with embodiments of the invention, permitted the:

distributing the designing work among several people;

obtaining shorter listings that were easy to check function-wise; and providing of a modular structure where modules can be easily added or subtracted.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A method of fabricating a control unit for electronic microcontrollers or microprocessors, comprising providing constructed of a plurality of control sub-units, each corresponding to at least one unique combinatorial logic network, and each of the plurality of sub-units is independently connected to an arbitration block for supplying information about a possible future state, and receiving a present state command.

2. The method according to claim 1, wherein each sub-unit of the plurality of sub-units is structurally and functionally independent to the other sub-units.

3. The method according to claim 1, wherein each control sub-unit supplies the arbitration block with a predetermined value representing a predetermined state of operation or a neutral state.

4. The method according to claim 1, wherein each sub-unit proposes, based on a type of instruction to be executed by the control unit, a possible state of its own to the arbitration block, and wherein only one of the sub-units is in an active state, while all of the other sub-units of the plurality of sub-units are in a neutral state.

5. A method of fabricating a control unit for electronic microcontrollers or microprocessors, the method comprising:

creating a finite state machine that further comprises:
creating a functional description of an arbitration block structured to accept a plurality of inputs; and
creating a function description of a plurality of individual control blocks that each correspond to a unique combinatorial logic circuit, each control block having a first output coupled to a respective one of the plurality of inputs of the arbitration block, and each control block having an input structured to accept a current state of the arbitration block.

6. The method of claim 5, wherein each of the plurality of individual control blocks is configured to include a second output, and the method further comprising:

creating a functional description of a collection block structured to accept a plurality of inputs structured to receive a respective signal from the second output of the plurality of individual control blocks, the collection block structured to select one of the inputs as an output signal of the control unit.

7. The method of claim 5, wherein creating a functional description of a collection block further includes structuring each collection block to output a proposed state.

8. The method of claim 5, wherein creating a functional description of a plurality of individual control blocks further comprises not directly coupling the output of each of the plurality of individual control blocks to any of the other control blocks in the plurality of individual control blocks.

9. The method of claim 8, wherein each of the individual control blocks is configured to receive the same current state of the arbitration block at the same time.

10. The method of claim 5, wherein creating a functional description of a plurality of individual control blocks comprises describing the functions of the plurality of individual control blocks in a hardware description language.

11. The method of claim 10, wherein describing the functions of the plurality of individual control blocks in a hardware description language comprises creating listing files in VHDL.

12. The method of claim 5, wherein each of the plurality of individual control blocks represents a separate class of instructions.

* * * * *

UNITED STATES PATENT AND TRADEMARK OFFICE
CERTIFICATE OF CORRECTION

PATENT NO. : 6,668,199 B1
DATED : December 23, 2003
INVENTOR(S) : Liliana Arcidiacono et al.

It is certified that error appears in the above-identified patent and that said Letters Patent is hereby corrected as shown below:

Title page,
Item [54], title should read as -- **FABRICATION METHOD FOR A CONTROL UNIT FOR ELECTRONIC MICROCONTROLLERS OR *MICROPROCESSORS* --**

Signed and Sealed this

Eleventh Day of May, 2004

JON W. DUDAS
*Acting Director of the United States Patent and Trademark Office*